United States Patent
Kawazura et al.

(10) Patent No.: US 6,180,717 B1
(45) Date of Patent: Jan. 30, 2001

(54) BLOCK COPOLYMER AND RUBBER COMPOSITION AND PNEUMATIC TIRE CONTAINING THE SAME

(75) Inventors: Tetsuji Kawazura; Masayuki Kawazoe; Yasushi Kikuchi; Toru Nakamura, all of Hiratsuka; Masao Nakamura; Takeshi Karato, both of Kawasaki, all of (JP)

(73) Assignees: Yokohama Rubber Co., Ltd.; Nippon Zeon Co., Ltd., both of Tokyo (JP)

( * ) Notice: Under 35 U.S.C. 154(b), the term of this patent shall be extended for 0 days.

(21) Appl. No.: 09/147,431
(22) PCT Filed: Jun. 24, 1997
(86) PCT No.: PCT/JP97/02170
§ 371 Date: Feb. 18, 1999
§ 102(e) Date: Feb. 18, 1999
(87) PCT Pub. No.: WO97/49743
PCT Pub. Date: Dec. 31, 1997

(30) Foreign Application Priority Data

| Jun. 26, 1996 | (JP) | 08/166348 |
| Jul. 19, 1996 | (JP) | 08/190677 |
| Jul. 19, 1996 | (JP) | 08/207607 |
| May 14, 1997 | (JP) | 09/124383 |

(51) Int. Cl.[7] ............... C08L 9/06; C08L 53/02
(52) U.S. Cl. ................. 525/98; 525/89; 525/99; 525/241; 525/250
(58) Field of Search .................. 525/98, 99, 89, 525/241, 250

(56) References Cited

U.S. PATENT DOCUMENTS

| 4,122,134 | 10/1978 | Miki et al. ................ 525/314 |
| 4,670,502 | * 6/1987 | Hargis et al. ............... 524/505 |
| 5,227,424 | 7/1993 | Tokieda et al. ............... 524/496 |
| 5,679,744 | * 10/1997 | Kawauzra et al. ............... 525/98 |

FOREIGN PATENT DOCUMENTS

| 1-301734 | 12/1989 | (JP) . |
| 7-233228 | 9/1995 | (JP) . |
| WO 95/35335 | 12/1995 | (WO) . |
| WO 96/25442 | 8/1996 | (WO) . |
| WO97/49743 | 12/1997 | (WO) . |

OTHER PUBLICATIONS

Abstract of Japanese Patent Publication No.01081811; dated Mar. 28, 1989.

Abstract of Japanese Patent Publication No. 08302071; dated Nov. 19, 1996.

* cited by examiner

*Primary Examiner*—James J. Seidleck
*Assistant Examiner*—Olga Asinovsky
(74) *Attorney, Agent, or Firm*—Arent Fox Kinter Plotkin & Kahn, PLLC

(57) ABSTRACT

A block copolymer (1) containing a polymer block A of a conjugated diene and a random copolymer block B of a conjugated diene and aromatic vinyl compound, (2) having a weight ratio (A:B) of the polymer block A and the copolymer block B of 5:95 to 95:5, (3) having a bound aromatic vinyl compound content in the copolymer block B of 1 to 50% by weight, (4) having a weight average molecular weight (Mw) of 100,000 to 5,000,000, and (5) having at least two transition points measured by differential scanning calorimetry in the range of −150° C. to +150° C., a method of production of the same, and a rubber composition and pneumatic tire containing the same.

7 Claims, No Drawings

BLOCK COPOLYMER AND RUBBER COMPOSITION AND PNEUMATIC TIRE CONTAINING THE SAME

TECHNICAL FIELD

The present invention relates to a novel block copolymer, a rubber composition containing the block copolymer, and methods of producing the same. The block copolymer of the present invention can compatibilize mutually incompatible diene rubbers and can further provide a rubber composition having improved tensile strength, abrasion resistance, etc., without decreasing the vulcanization activity and further without changing the inherent properties of the polymer blend, for example, the low fuel consumption, wet braking performance, etc., by blending the block copolymer to a diene rubber. The block copolymer and rubber composition of the present invention may be suitably used in the fields of tire rubber etc.

The present invention further relates to a pneumatic tire improved in abrasion resistance and chipping resistance.

BACKGROUND ART

In the past, rubber for use for tires of automobiles etc. has been required to have various performances such as strength, abrasion resistance, low heat buildup, high impact resilience, wet skid resistance, and chipping resistance. However it is difficult to satisfy these required performances by a single type of rubber, and therefore, for example, attempts have been made to balance and improve the performances by using blends of several diene rubbers such as blends of natural rubber and styrene-butadiene copolymer rubber (SBR). However, even if in the case of diene rubbers, since the rubbers are of different types, they are not necessarily fully compatible and sometimes are incompatible. In particular, when diene rubbers are incompatible, even if they are homogeneously mixed, it is difficult to obtain sufficient vulcanized properties.

Therefore, in recent years, various methods have been proposed for compatibilize incompatible diene based rubbers. For example, Japanese Unexamined Patent Publication (Kokai) No. 7-188510 discloses a method of using, as a type of compatibilizing agent, a block copolymer composed of styrene-butadiene copolymer (SBR) block having a bound styrene content of not more than 30% by weight and an amount of vinyl bonds of the butadiene part of not more than 40 mol % and an SBR block with an amount of bonded styrene of not more than 30% by weight and a bound vinyl content of the butadiene part of not less than 70 mol %. However, in this method, there is the disadvantage that, while it is possible to compatibilize natural rubber and SBR, the vulcanization rate becomes slower and further the improvement in the abrasion resistance, tensile strength, and other vulcanized properties is not sufficient.

Japanese Unexamined Patent Publication (Kokai) No. 64-81811 reports a block copolymer composed of a polyisoprene block having a bound 1,4-cis content of not less than 65 mol % and an SBR block having a bound styrene content of 5 to 40% by weight and a bound vinyl content of the butadiene part of not less than 55 mol %. This block copolymer, when used as a compatibilizing agent for natural rubber and SBR, cannot give a sufficient effect of improvement of the abrasion resistance, tensile strength, etc. According to studies by the present inventors, this block copolymer only shows a single transition point in analysis by differential scanning calorimetry (DSC). This is deduced to be the cause for why a sufficient compatibilizing action cannot be obtained between different types of rubbers.

In recent years, improvement of various performances has been sought from rubber compositions for tires of automobiles and the like. Therefore, the practice has been to blend several types of polymers in rubbers for tire blends etc. When these polymers are incompatible, a phase separation is present at the interface. In most cases, it is believed that this interface becomes a starting point of breakage and has an adverse effect on the tensile strength, tear strength, abrasion resistance, etc. However, in rubber products such as tires, the unique processing, i.e., vulcanization is involved, and therefore, it is not possible to apply as is the molecular design of block copolymers for controlling a phase structure such as is done in ordinary rubber/resin and resin/resin blends. However, the problem of the phase separation at the interface of rubber/rubber blends, has not been sufficiently studied and no method for solving the problem has been discovered either.

In the past, the decrease in the breaking strength due to the incompatibility of a polymer blend obtained by blending in a block copolymer has not been sufficiently studied. Formulating a small amount of a block copolymer of polybutadiene (BR) and polyisoprene (IR) in a blend of natural rubber (NR)/polybutadiene rubber (BR) has only been briefly described in J. Apply. Polym. Sci., 49 (1993) and RCT. 66 (1993). The compositions of the block copolymers used in these references are not satisfactory in performance in actual use due to the insufficient compatibility with BR. Further, experiments have been made on adding cis-BR to incompatible polymer blends of cis-BR/SBR to improve the abrasion resistance, but there is a limit to the amount of the cis-BR added due to the decrease in the wet braking performance, and therefore, there have been problems in actual use.

In consideration of the above situation, the present inventors previously proposed tire trend compositions containing an A-B type block copolymer (see Japanese Unexamined Patent Publication (Kokai) No. 7-188510 and Japanese Unexamined Patent Publication (Kokai) No. 8-134267).

On the other hand, in the past, blends of several types of polymers have been used for treads of pneumatic tires to improve various aspects of their performance. In particular, when trying to improve the abrasion resistance and heat buildup property, a blend of styrene-butadiene copolymer rubber (SBR) or polybutadiene rubber (BR) having a low glass transition temperature (low Tg) is often used with a natural rubber (NR) or polyisoprene rubber (IR). However, in such a blend, there is the disadvantage that, while the abrasion resistance and heat buildup property are improved, the chipping resistance is inferior due to the low breaking strength and breaking energy.

As mentioned above, the breaking strength and breaking energy are low in a blend of polymers due to the failure of the polymers to mix well with each other (incompatible). Since they are incompatible, there is a phase separation at the interface in the blend. This interface serves as the starting point for breakage and invites a decrease in the breaking energy. Further, since they are incompatible, the so-called "islands in the sea" state is present in the blend, and therefore, the carbon black introduced into the blend for reinforcement purposes are localized in different areas and the problem arises that the breaking strength is decreased. Therefore, as a measure against this, it has been proposed to add carbon black having a small particle size and low structure into the blend, but in this case as well it has not been possible to secure a sufficient abrasion resistance.

DISCLOSURE OF THE INVENTION

Accordingly, the object of the present invention is to provide a novel polymer compatibilizing agent which can eliminate the above problems in the prior art, which can compatibilize diene based rubbers having insufficient compatibility, and which can improve the abrasion resistance, tensile strength, etc. without slowing the vulcanization rate.

Another object of the present invention is to provide a rubber composition having an excellent vulcanization rate and superior abrasion resistance or tensile strength.

Another object of the present invention is to provide a rubber composition which, when used for a tire, can improve the abrasion resistance and chipping resistance without adversely affecting the low fuel consumption, wet braking performance, and other properties.

Still another object of the present invention is to provide a pneumatic tire which is improved in abrasion resistance and chipping resistance by adding a specific block polymer to a blend of incompatible polymers to form a tread rubber having a fine phase structure.

In accordance with the present invention, there is provided a block copolymer (1) containing a polymer block A of a conjugated diene and a random copolymer block B of a conjugated diene and an aromatic vinyl compound, (2) having a weight ratio (A:B) of the polymer block A and the copolymer block B of 5:95 to 95:5, (3) having a bound aromatic vinyl compound content in the copolymer block B of 1 to 50% by weight, (4) having a weight average molecular weight (Mw) of 100,000 to 5,000,000, and (5) having at least two transition points measured by differential scanning calorimetry in the range of −150° C. to +150° C.

In accordance with the present invention, there is also provided a method of producing a block copolymer comprising the step of: in a hydrocarbon based solvent and using an organic active metal as an initiator, (I) (i) first polymerizing a conjugated diene to produce a polymer block A of a conjugated diene, then (ii) polymerizing a mixture of a conjugated diene and an aromatic vinyl compound in the presence of the polymer block A having an active end or (II) (i) first polymerizing a mixture of a conjugated diene and an aromatic vinyl compound to produce a random copolymer block B, and then (ii) polymerizing a conjugated diene in the presence of the copolymer block B having an active end to produce a polymer block A of a conjugated diene.

In accordance with the present invention, there is further provided a rubber composition comprising a block copolymer (1) containing a polymer block A of a conjugated diene and a random copolymer block B of a conjugated diene and an aromatic vinyl compound, (2) having a weight ratio (A:B) of the polymer block A and the copolymer block B of 5:95 to 95:5, (3) having a bound aromatic vinyl compound content in the copolymer block B of 1 to 50% by weight, (4) having a weight average molecular weight (Mw) of 100,000 to 5,000,000, and (5) having at least two transition points measured by differential scanning calorimetry in the range of −150° C. to +150° C. and at least one diene rubber.

In accordance with the present invention, there is further provided a method of producing a rubber composition comprising mixing a block copolymer (1) containing a polymer block A of a conjugated diene and a random copolymer block B of a conjugated diene and an aromatic vinyl compound, (2) having a weight ratio (A:B) of the polymer block A to the copolymer block B of 5:95 to 95:5, (3) having a bond aromatic vinyl content in the copolymer block B of 1 to 50% by weight, (4) having a weight average molecular weight (Mw) of 100,000 to 5,000,000, and (5) having at least two transition points measured by differential scanning calorimetry in the range of −150° C. to +150° C. and at least one diene rubber so as to produce a rubber composition, wherein at least one diene rubber (X) compatible with the polymer block A in the block copolymer and at least one diene rubber (Y) compatible with the copolymer block B are used as the diene rubber, the block copolymer is first mixed with either one compound of the diene rubber (X) component and diene rubber (Y) component of the diene rubber, followed by mixing with the other compound.

In accordance with the present invention, there is still further provided a rubber composition for a tire comprising (1) an incompatible polymer blend composed of at least two rubbers selected from natural rubber (NR), synthetic isoprene rubber (IR), polybutadiene rubber (BR), and styrene-butadiene copolymer rubber (SBR), wherein two polymer phases X' and Y' are formed, and (2) 0.1 to 20 parts by weight, based on 100 parts by weight of the total rubber components including the block copolymer, of a block copolymer composed of a monomer selected from the group consisting of isoprene, butadiene, and styrene having at least two blocks A' and B', the blocks A' and B' being mutually incompatible, the block A' being compatible with the polymer phase X' and incompatible with the polymer phase Y', the block B' being compatible with the polymer phase Y' and incompatible with the polymer phase X', wherein an amount of 1,4-bonds contained in the block A' and B' is at least 50,000, when converted to the weight average molecular weight, and a ratio A'/B' of the amount of 1,4-bonds contained in the blocks A' and B' is 0.67 to 1.50.

In accordance with the present invention, there is still further provided a pneumatic tire having a tread made of a rubber composition comprising 100 parts by weight of a rubber component composed of (a) 50 to 90 parts by weight of natural rubber and/or polyisoprene rubber, (b) 8 to 40 parts by weight of styrene-butadiene copolymer or polybutadiene rubber having a glass transition temperature of not more than −75° C., and (c) 0.5 to 20 parts by weight of an A"-B" (or B'") type block copolymer composed of a block A" of polyisoprene having a cis content of at least 70% by weight and a block B" of poly(styrene-butadiene) having a styrene content of less than 20% by weight and a 1,2-vinyl bond content of less than 50% or a block B'" of polybutadiene in which 35 to 55 parts by weight of carbon black having a CTAB surface area of more than 125 m²/g and a C-DBP oil absorption of 100 to 150 ml/100 g is formulated.

BEST MODE FOR CARRYING OUT THE INVENTION

The present inventors engaged in intensive studies for achieving the above objects and, as a result, found that a novel block copolymer containing a polymer of a conjugated diene and a copolymer block of a conjugated diene and an aromatic vinyl compound and having at least two transition points measured by differential scanning calorimetry within the range of −150° C. to +150° C. exhibits a remarkable effect of improvement of the compatibility among different types of diene rubbers. We further found that a rubber composition composed of this block copolymer blended in a diene rubber has excellent vulcanization rate, improved property of the abrasion resistance or tensile strength, and further remarkably improved abrasion resistance and chipping resistance when formed into a pneumatic tire. Further, the abrasion resistance may be further improved by narrowing the distribution of the molecular weight (Mw/Mn) of the block copolymer. By fine tuning the method of production of the block copolymer or the method of preparation of the rubber composition, it is possible to further bring out the above-mentioned characteristic points.

The present invention was completed based on the above findings.

The block copolymer according to the first aspect of the present invention includes a polymer block A composed of a conjugated diene and a random copolymer block B of a conjugated diene and an aromatic vinyl compound and has at least two transition points measured by differential scanning calorimetry (DSC) within the range of −150° C. to +150° C. The number of transition points is preferably two. If there is only one transition point measured by DSC, it is not possible to sufficiently bring out the effect of compatibilization of insufficiently compatible or incompatible diene rubbers.

The conjugated diene used in the production of the block copolymer is not particularly limited. For example, 1,3-butadiene, 2-methyl-1,3-butadiene (that is, isoprene), 2,3-dimethyl-1,3-butadiene, 2-chloro-1,3-butadiene, 1,3-pentadiene, etc. may be mentioned. Among these, 1,3-butadiene, 2-methyl-1,3-butadiene, etc. are preferable. These conjugated dienes may be used alone or in any combinations of two or more.

The aromatic vinyl compound used in the production of the block copolymer is not particularly limited. For example, styrene, a-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene, etc. may be mentioned. Among these, styrene is preferable. These aromatic vinyl compounds may be used alone or in any combinations of two or more.

The polymer block A is a polymer block of substantially only a conjugated diene. In particular, when a polymer block of 2-methyl-1,3-butadiene, is used, the vulcanization rate, abrasion resistance, and tensile strength are preferably balanced to a high degree. If an olefinic monomer such as an aromatic vinyl compound is bonded in a significant amount with the polymer block A, when the block copolymer obtained is used as a compatibilizing agent for two or more types of diene rubbers, the vulcanization rate becomes slower and the effect of improvement of the abrasion resistance, tensile strength, etc. can no longer be obtained.

The microstructure of the polymer block A portion is not particularly limited. For example, the bound vinyl content (i.e., the amount of 1,2-vinyl bonds+the amount of 3,4-vinyl bonds) is normally in the range of 1 to 80 mol %. The amount of vinyl bonds is preferably 2 to 50 mol %, more preferably 3 to 30 mol %. At this time, the tendency is that the vulcanization rate becomes better and, further, the abrasion resistance, tensile strength, etc. are improved to a high degree. The bound vinyl content is particularly preferably often 3 to 15 mol %. The remaining bonds other than the vinyl bonds are 1,4-bonds. The ratio of the cis-1,4-bonds and trans-1,4-bonds among them is suitably selected depending upon the purpose of use.

The amount of the bonded aromatic vinyl (S) in the copolymer block B is suitably selected in accordance with the purpose of use, but normally is 1 to 50% by weight, preferably 5 to 45% by weight, more preferably 20 to 40% by weight. When the bound aromatic vinyl content is in these ranges, the tensile strength of the rubber composition preferably becomes excellent.

The microstructure of the conjugated diene portion in the copolymer block B is suitably selected depending upon the purpose of use and is not particularly limited. For example, the bound vinyl content (V) (i.e., 1,2-vinyl bonds or 1,2-vinyl bonds+3,4-vinyl bonds) is normally 1 to 55 mol % of the bound conjugated diene units in the copolymer block B. The bound vinyl content is preferably 5 to 55 mol %, more preferably 10 to 50 mol %. When the bound vinyl content is within this range, the vulcanized properties and abrasion resistance of the rubber composition are improved. The bonds other than the vinyl bonds of the conjugated diene portion are 1,4-bonds. The ratio of the cis-1,4-bonds and trans-1,4-bonds in these bonds is suitably selected depending upon the purpose of use.

When the amount S and amount V in the copolymer block B are within the above range and the relation:

$V<2S+17$ stands, the effect of compatibilization of the incompatible diene rubbers is high. In particular, the abrasion resistance and tensile strength can be preferably improved to a high degree.

Further, the ratio between the amount of 1,4-bonds (A-1,4) in the polymer block A and the amount of 1,4-bonds (B-1,4) in the conjugated diene portion in the copolymer B is not particularly limited and is suitably selected depending upon the purpose of use, but the molar ratio of (A-1,4):(B-1,4) is normally 1:9 to 9:1, preferably 3:7 to 7:3, more preferably 4:6 to 6:4. When the ratio of the two is within this range, preferably the vulcanization rate is better and the effect of improvement of the tensile strength, abrasion resistance, etc. is also high.

The distribution of chains of the aromatic vinyl units in the copolymer block B is suitably selected depending upon the purpose of use, but independent chains with one bound aromatic vinyl measured by the ozone degradation method (hereinafter referred to as S1 chains) normally comprise at least 40% by weight of the total amount of bound aromatic vinyl, preferably at least 50% by weight, more preferably at least 60% by weight. Further, long chains having 8 bound aromatic vinyl units measured by the ozone degradation method (hereinafter referred to as S8 chains) normally comprise not more than 10% by weight of the total amount of bound aromatic vinyl, preferably not more than 5% by weight, more preferably 3% by weight. When the S1 chains and the S8 chains are within this range, preferably the heat buildup property is particularly excellent.

The weight ratio (A:B) of the polymer block A and the copolymer block B is normally 5:95 to 95:5, preferably 10:90 to 70:30, more preferably 20:80 to 50:50. When the ratio of the polymer block A and the copolymer block B is within this range, the vulcanization rate is preferably sufficiently improved.

The molecular weight of the block copolymer of the present invention is, in terms of weight average molecular weight (Mw) measured by the gel permeation chromatography (GPC) method and converted to a polystyrene value, 100,000 to 5,000,000, preferably 300,000 to 3,000,000, more preferably 500,000 to 1,500,000. If the weight average molecular weight (Mw) is excessively small, it is difficult to sufficiently bring out the effect of compatibilization and the effect of improvement of the abrasion resistance, tensile strength, etc. is also poor, while conversely if excessively large, the processability is decreased. Accordingly, neither of these is preferred.

The distribution of the molecular weight of the block copolymer of the present invention is not particularly limited, but when the ratio (Mw/Mn) between the weight average molecular weight (Mw) and the number average molecular weight (Mn) measured by the above GPC method is normally not more than 2.5, preferably not more than 2.0, more preferably not more than 1.5, the effect of compatibilization is preferably high.

The method of production of the block copolymer of the present invention is not particularly limited, but for example it may be produced by the method of (1) polymerizing a conjugated diene to produce a polymer block A of the conjugated diene in a hydrocarbon solvent using an organic active metal as an initiator, then (2) polymerizing a mixture of a conjugated diene and aromatic vinyl compound in the presence of the polymer block A having an active end to produce a random copolymer block B (method a) or the method of (1) polymerizing a mixture of a conjugated diene and aromatic vinyl compound in a hydrocarbon solvent using an organic active metal as an initiator to produce a random copolymer block B, then (2) polymerizing a conjugated diene in the presence of the copolymer block B having an active end to produce a polymer block A of the conjugated diene (method b). The method a is particularly preferable from the viewpoint of the easy polymerization operation and the physical properties of the block copolymer obtained.

In particular, a block copolymer having a narrow molecular weight (Mw/Mn) distribution can be obtained by the method of charging a hydrocarbon solvent, Lewis base, and conjugated diene into the reaction system, then adding the organic active metal to initiate the polymerization reaction, producing the polymer A of the conjugated diene, then adding a mixture of a conjugated diene and aromatic vinyl for further polymerization etc.

As the organic active metal, for example, an anionically polymerizable organic active metal compound such as an organic alkali metal compound, an organic alkali earth metal compound, or an organic lanthanoid rare earth metal compound may be mentioned. Among these, an organic alkali metal compound is particularly preferred from the viewpoints of the polymerization reactivity, economy, etc.

As the organic alkali metal compound, for example, mono organolithium compounds such as n-butyl lithium, sec-butyl lithium, t-butyl lithium, hexyl lithium, phenyl lithium, and stilbene lithium; polyfunctional organolithium compounds such as dilithiomethane, 1,4-dilithiobutane, 1,4-dilithio-2-ethylcyclohexane, and 1,3,5-trilithiobenzene; sodium naphthalene, potassium naphthalene, etc. may be mentioned. Among these, organolithium compounds are preferred. Mono organolithium compounds are particularly preferred.

As the organic alkali earth metal compound, for example, n-butyl magnesium bromide, n-hexyl magnesium bromide, ethoxy calcium, calcium stearate, t-butoxy strontium, ethoxy barium, isopropoxy barium, ethyl mercapto barium, t-butoxy barium, phenoxy barium, diethyl amino barium, barium stearate, ethyl barium, etc. may be mentioned.

As the organic lanthanoid rare earth metal compound, for example, a composite catalyst composed of neodium basatate/triethyl aluminum hydride/ethyl aluminum sesquiochloride as described in Japanese Examined Patent Publication (Kokoku) No. 63-64444 etc. may be mentioned.

These organic active metals may be used alone or in any combinations of two or more. The amount of the organic active metal used is suitably selected depending upon the molecular weight of the produced polymer required and is normally in the range of 0.01 to 20 mmol per 100 g of total monomer, preferably 0.05 to 15 mmol, more preferably 0.1 to 10 mmol.

As the Lewis base, for example, an ether such as tetrahydrofuran, diethylether, dioxane, ethylene glycol dimethyl ether, ethylene glycol dibutyl ether, diethylene glycol dimethyl ether, and diethylene glycol dibutyl ether; a tertiary amine compound such as tetramethyl ethylene diamine, trimethyl amine, triethylene amine, pyridine, and kinucridine; an alkali metal alkoxide compound such as potassium-t-amyloxide, and potassium-t-butyloxide; a phosphine compound such as triphenyl phosphine; and other compounds may be mentioned. Among these, an ether or tertiary amine compound etc. are preferable.

These Lewis bases may be used alone or in any combinations of two or more. The amount of the Lewis base used is normally 0 to 200 moles per mole of the organic active metal, preferably 0.01 to 100 moles, more preferably 0.1 to 50 moles, most preferably 0.3 to 20 moles.

The polymerization reaction may be any of an isothermic reaction or adiabatic reaction and normally is performed in the range of polymerization temperature of 0° C. to 150° C., preferably 20° C. to 120° C. After the end of the polymerization reaction, an ordinary method is used, for example, an alcohol such as methanol or isopropanol is added as a terminator, to stop the polymerization reaction, an antioxidant (stabilizer) or cram agent is added, then the solvent is removed by direct drying, steam stripping, or another method and the produced polymer is recovered.

The rubber composition according to the first aspect of the present invention contains at least one diene rubber and the above block copolymer as essential ingredients.

As the diene rubber, to bring out the compatibilizing action of the block copolymer of the present invention, preferably a combination of at least two diene rubbers which are mutually incompatible or poorly compatible is used. More specifically, as the diene rubber, normally at least one diene rubber (X) compatible with the polymer block A in the block copolymer and at least one diene rubber (Y) compatible with the copolymer block B are included. As combinations of these diene rubbers (X) and (Y), for example, combinations of various types of rubbers used as rubber ingredients for tire treads may be mentioned.

Whether or not a diene rubber is compatible with the polymer block A or copolymer block B in the block copolymer of the present invention may be determined by DSC analysis of the blend. That is, (1) The transition points of the block copolymer are measured by DSC to find the transition point ($T_A$) based on the polymer block A and the transition point ($T_B$) based on the copolymer block B.

(2) The transition point ($T_C$) of the diene rubber C is found by DSC.

(3) The block copolymer and the diene rubber C are mixed (normally at 40 to 100° C. for 5 to 15 minutes) and the mixture measured by DSC, wherein:

[1] When three transition points ($T_A$, $T_B$, and $T_C$) are measured, the diene rubber C is determined to be incompatible with both the polymer block A and the copolymer block B.

[2] When the transition points of $T_A$ and $T_C$ disappear and a new transition point T occurs between $T_A$ and $T_C$, the diene rubber C can be determined to be a diene rubber (X) compatible with the polymer block A.

[3] When the transition points of $T_B$ and $T_C$ disappear and a new transition point T occurs between $T_B$ and $T_C$, the diene rubber C can be determined to be a diene rubber (Y) compatible with the copolymer block B.

More specifically, based on the above-mentioned determination method, as a preferable example of the diene rubber (X) compatible with the polymer block A in the block copolymer of the present invention, for example, natural rubber, polyisoprene rubber, isoprene-butadiene rubber, etc. may be mentioned. Among these, natural rubber, polyisoprene rubber having at least 70 mol % of 1,4-bonds, and butadiene-isoprene rubber having an isoprene content of at least 50% by weight and at least 70 mol % of 1,4-bonds are preferable. These diene rubbers (X) may be used alone or in any combinations of two or more.

As preferable specific examples of the diene rubber (Y) compatible with the copolymer block (B) in the block copolymer of the present invention, for example, styrene-butadiene rubber, styrene-isoprene rubber, styrene-isoprene-butadiene rubber, butadiene rubber, lower acrylonitrile-butadiene rubber, etc. may be mentioned. Among these, a styrene-butadiene rubber or styrene-isoprene-butadiene rubber having a styrene content of not more than 35% by weight and a bound vinyl content of the conjugated diene portion (i.e., the amount of 1,2-bonds or 1,2-bonds+3,4-bonds) of 17 to 70 mol % etc. are preferable and styrene-butadiene rubber having a bound styrene content of 10 to 30% by weight and a bound vinyl content of the conjugated diene portion of 30 to 65 mol % or a styrene-isoprene-butadiene rubber having a bound isoprene content of 1 to 10% by weight is more preferable.

These diene rubbers may be used alone or in any combinations of two or more. The ratio of the diene rubber (X) and the diene rubber (Y) is suitably selected depending upon the purpose of use and is, in terms of the weight ratio of X:Y, normally 5:95 to 95:5, preferably 10:90 to 90:10, more preferably 30:70 to 70:30.

The Mooney viscosity ($ML_{1+4}$, 100° C.) of the diene rubbers is suitably selected depending upon the purpose of use, but normally is 10 to 250, preferably 30 to 200, more preferably 40 to 150.

The ratio of the block copolymer formulated in the diene rubber component is suitably selected depending upon the purpose of use, but is normally 0.1 to 40 parts by weight based upon 100 parts by weight of the diene rubber component (i.e., total amount), preferably 1 to 30 parts by weight, more preferably 5 to 25 parts by weight. When the ratio of formulation of the block copolymer is within this range, the compatibilizing effect and vulcanized properties are preferably excellent.

The rubber composition of the present invention normally has a reinforcing agent blended therein. As the reinforcing agent, for example, carbon black, silica, etc. may be mentioned. The carbon black is not particularly limited, but for example Furnace Black, Acetylene Black, Thermal Black, Channel Black, graphite, etc. may be used. Among these, Furnace Black is particularly preferred. As specific examples, SAF, ISAF, ISAF-HS, ISAF-LS, IISAF-HS, HAF, HAF-HS, HAF-LS, FEF, and other various grades may be mentioned. These carbon blacks may be used alone or in any combinations of two or more. The nitrogen specific area ($N_2SA$) of the carbon black is not particularly limited, but is normally 5 to 200 $m^2/g$, preferably 50 to 150 $m^2/g$, more preferably 80 to 130 $m^2/g$. Further, the DBP oil absorption of the carbon black is not particularly limited, but is normally 5 to 300 ml/100 g, preferably 50 to 200 ml/100 g, more preferably 80 to 160 ml/100 g.

By using as the carbon black High Structure Carbon Black having a cetyl trimethyl ammonium bromide (CTAB) specific area of 110 to 170 $m^2/g$ and a DBP (24M4DBP) oil absorption after compression 4 times repeatedly at a pressure of 24,000 psi of 110 to 130 ml/100 g as disclosed in Japanese Unexamined Patent Publication (Kokai) No. 5-230290, the abrasion resistance can be improved.

The silica is not particularly limited, but for example a dry type white carbon, wet type white carbon, colloidal silica, precipitated silica disclosed in Japanese Unexamined Patent Publication (Kokai) No. 62-62838, etc. may be mentioned. Among these, the wet type white carbon containing hydrous silica as its main ingredient is particularly preferable. The specific surface area of the silica is not particularly limited, but when specific surface area by nitrogen absorption ($N_2SA$) (BET method) is normally 50 to 400 $m^2/g$, preferably 100 to 250 $m^2/g$, more preferably 120 to 190 $m^2/g$, a sufficient improvement of the heat buildup property, tensile strength, processability, etc. is preferably achieved. Here, the specific surface area by nitrogen absorption is the value measured by the BET method based on ASTM D3037-81.

These reinforcing agents may be used alone or in any combinations of two or more. The ratio of formulation of the reinforcing agent is suitably selected depending upon the purpose of use, but normally is 10 to 200 parts by weight based on 100 parts by weight of the diene rubber component (total amount), preferably 20 to 150 parts by weight, more preferably 30 to 120 parts by weight.

The rubber composition of the present invention may optionally contain other compounding agents generally used in the rubber industry. As these other compounding agents, for example, a vulcanization agent, vulcanization accelerator, anti-aging agent, activator, plasticizer, lubricant, filler, etc. may be mentioned. The amount of formulation of these compounding agents is suitably selected in a range not adversely affecting the effects of the present invention.

The rubber composition of the present invention may be obtained by mixing (or kneading) the above ingredients according to an ordinary method. For example, at least one diene rubber, the block copolymer, and the compounding agents other than vulcanization agent and vulcanization accelerator may be mixed, then the vulcanization agent and vulcanization accelerator mixed into this mixture to obtain the rubber composition.

In particular, when the diene rubber to be mixed with the block copolymer is composed of a diene rubber (X) compatible with the polymer block A in the block copolymer and a diene rubber (Y) compatible with the copolymer block B, if either one component of the diene rubbers (X) and (Y) is mixed with the block copolymer, then the remaining diene rubber is mixed, the properties such as the tensile strength and the abrasion resistance can be further preferably improved.

The temperature of mixing of the diene rubber, block copolymer, and compounding agents other than the vulcanization agent and the vulcanization accelerator is normally room temperature to 250° C., preferably 40° C. to 200° C., more preferably 50° C. to 180° C. The kneading time is normally at least 30 seconds, preferably 1 to 30 minutes. The vulcanization agent and the vulcanization accelerator are normally mixed after cooling to not more than 100° C., preferably room temperature to 80° C. The mixture is then press vulcanized at a temperature of normally 120° C. to 200° C., preferably 140° C. to 180° C.

The rubber composition for tire use according to the second aspect of the present invention is composed of formulating (1) an incompatible polymer blend of two polymer phases X' and Y' (the preferable X'/Y' weight ratio being 5/95 to 95/5, more preferably 10/90 to 90/10) comprising at least two incompatible rubbers selected from NR, IR, BR, and SBR with (2) 0.1 to 20 parts by weight, preferably 0.3 to 18 parts by weight, based upon 100 parts by weight of the total rubber component including the block copolymer, of a block copolymer having at least two blocks composed of monomers selected from isoprene, butadiene, and styrene, wherein the blocks A' and B' is mutually incompatible, the block A' is compatible with the polymer phase X' and incompatible with the polymer phase Y', the block B' is compatible with the polymer phase Y' and incompatible with the polymer phase X', and the amount of 1,4-bonds contained in the blocks A' and B' is at least 50,000 when converted to the weight average molecular weight, and the ratio A'/B' of the 1,4-bonds (converted to molecular weight) contained in the blocks A' and B' is 0.67 to 1.50.

That is, the present inventors observed that addition of a suitable block copolymer when kneading a phase-separated polymer blend resulted in the block copolymer acting as a compatibilizing agent and increasing the fineness of the phase structure and reinforcing the phase separated interface, but found that, if the cross-linking bonds between the blocks of the block copolymer and the polymer forming the matrix were not effectively caused at the time of vulcanization, the deformation at the time of vulcanization caused the finer phase structure and reinforced interface to return to their original states and the effect of improvement of the breaking strength etc. is decreased. They engaged in in-depth studies on prevention of this decrease in the effect of improvement of the breaking strength and, as a result, found that it was possible to solve the above-mentioned problems by specifying the amounts and ratio of the 1,4-bonds contained in the blocks of the block polymer and causing the cross-linking reaction between the blocks and the matrices to proceed at substantially the equivalent rates.

The blocks A' and B' of the block copolymers used in the present invention have to be mutually incompatible or else the block copolymer molecules cannot sufficiently invade the matrix phases X' and Y', and therefore, the desired effect of improvement of the breaking properties cannot be obtained. Further, in the present invention, the block A' must be compatible with the polymer phase X' and incompatible with the polymer phase Y', while the block B' must be compatible with the polymer phase Y' and incompatible with the polymer phase X'. When this relationship is not maintained, the block copolymer cannot be positioned at the X' and Y' phase separated interface, and therefore, the phase separated interface is not reinforced and a sufficient effect of improvement of the breaking strength cannot be unpreferably obtained.

The amount of the 1,4-bonds contained in the blocks A' and B' of the block copolymer used in the present invention has to be, when converted into the weight average molecular weight, at least 50,000, preferably at least 55,000, or else a sufficient cross-linkability with the polymer component forming the matrix cannot be obtained. Therefore, in the same way as the above case, a sufficient reinforcement of the phase separated interface is not obtained and the desired effect of improvement of the breaking strength is not unpreferably obtained.

The ratio A'/B' of the amounts of 1,4-bonds (when converted to molecular weight) contained in the blocks A' and B' of the block copolymer used in the present invention is 0.67 to 1.50, preferably 0.70 to 1.40. If the ratio A'/B' is out of this range, a difference in the progress of the cross-linking arises between the blocks A' and B' of the block copolymer and the matrix phases X' and Y' at the time of the vulcanization reaction, the phase structure made finer in the kneading process reagglomerates and enlarges, and therefore, the desired effect of improvement of the breaking strength is not unpreferably obtained.

Further, showing the method of calculation of the amount of 1,4-bonds (when converted to molecular weight), if the styrene content (wt %) of a block measured in the process of polymerization of the block copolymer is St, the content of the vinyl polymerization unit of the conjugated diene polymer portion (total amount of 1,2-vinyl content (mol %) and 3,4-vinyl content (mol %) is Vn, the weight average molecular weight of the block copolymer as a whole is Mw, and the weight ratio of the block i is Wi, the amount of the 1,4-bonds of the block i (converted to molecular weight) is calculated by the following formula:

Amount of 1,4-bonds (when converted to molecular weight)=Mw×Wi×((100−St)/100)×((100−Vn)/100)

The method of production of the block copolymer (i) of the present invention is not particularly limited, but for example it may be produced by the method of polymerization of a monomer such as isoprene, butadiene, and styrene in a hydrocarbon solvent using an organic active metal as an initiator.

As the organic active metal, for example, an anionically polymerizable organic active metal such as an organic alkali metal compound, organic alkali earth metal compound, and organic lanthanoid rare earth metal compound may be mentioned. Among these, an organic alkali metal compound is particularly preferable.

According to the present invention, the block copolymer is formulated in an amount of 0.1 to 20 parts by weight, preferably 0.3 to 18 parts by weight, based upon 100 parts by weight of the total amount of the incompatible polymer blend and block copolymer. If the amount of formulation of the block copolymer is more than 20 parts by weight, the viscoelasticity of the block copolymer is adversely affected, and therefore, the originally intended balance of the wet braking property and tumbling resistance is unpreferably changed.

The incompatible polymer blend composed of the polymer phases X' and Y' used in the present invention is not particularly limited so long as at least two types of polymers selected from NR, IR, BR, and SBR are selected to form two incompatible polymer phases X' and Y'. Further, the block copolymer composed of the blocks A' and B' used in the present invention may be made any polymer provided with the above conditions. For example, a BR block, SBR block, IR block, SIR (styrene-isoprene rubber) block, BIR (butadiene-isoprene) block, SBIR (styrene-butadiene-isoprene) block, etc. may be suitably combined for use.

Specific examples of combinations of the incompatible polymers and block copolymer are given below:

A composition wherein the polymer phase X' is composed of polybutadiene (BR) having a cis content of at least 80% by weight, preferably 85 to 100% by weight, the polymer phase Y' is composed of natural rubber (NR) and/or a synthetic isoprene rubber (IR), and the blocks A' and B' of the block copolymer are SBR or BR having the following composition:

A': St=0 to 35% by weight (preferably 5 to 35% by weight), Vn=5 to 80 mol % (preferably 8 to 80 mol %), and Vn≦2St+30

B': St=0 to 30% by weight (preferably 5 to 30% by weight), Vn>2St+30 wherein St indicates the styrene content and Vn indicates the vinyl content of the butadiene part.

A rubber composition wherein the polymer phase X' is composed of styrene-butadiene rubber (SBR) and/or polybutadiene rubber (BR), the polymer phase Y' is natural rubber (NR) and/or synthetic isoprene rubber (IR), the block A' of the block copolymer is SBR or BR having the following composition, and the block B' is polyisoprene (IR) having the following composition:

A': (St)=0 to 50% by weight (preferably 5 to 50% by weight), Vn=5 to 70 mol % (preferably 8 to 70 mol %), and Vn≦2St+30

B': 1,4-bonds≧70% by weight (preferably 72 to 100% by weight)

wherein St indicates the styrene content and Vn indicates the vinyl content.

A composition wherein the polymer phase X' is composed of polybutadiene (BR) having at least 80% by weight cis content (preferably 85 to 100% by weight), the polymer phase Y' is composed of natural rubber (NR) and/or synthetic isoprene rubber (IR), the block A' of the block copolymer is composed of SBR or BR having the following composition, and the block B' is a polyisoprene (IR) having the following composition:

A': St=0 to 35% by weight (preferably 5 to 35% by weight), Vn=5 to 80 mol % (preferably 8 to 80 mol %), and Vn≦2St+30

B': 1,4 bonds≧70% by weight (preferably 72 to 100% by weight)

wherein St indicates the styrene content and Vn indicates the vinyl content.

A composition wherein the polymer phase X' is composed of a polybutadiene (BR) having at least 80% by weight cis content (preferably 85 to 100% by weight), the polymer phase Y' is composed of a styrene content of 5 to 60% by weight, a vinyl content of 5 to 35 mol % or 65 to 85 mol % or a styrene-butadiene rubber (SBR) having a styrene content of 35 to 60% by weight and a vinyl content of 35 to 65 mol %, the block A' of the block copolymer is a styrene-butadiene rubber (SBR) or polybutadiene rubber (BR) having the following composition, and the block B' is a styrene-butadiene rubber (SBR) having the following composition:

A': St=0 to 35% by weight, Vn=5 to 80 mol %

B': St=5 to 60% by weight, Vn=5 to 35 mol % or 65 to 85 mol % or St=35 to 60% by weight, Vn=35 to 65 mol % wherein St indicates the styrene content and Vn indicates the vinyl content of the butadiene part.

The rubber composition for a tire according to the second aspect of the present invention contains it at least 30 parts by weight, preferably 40 to 150 parts by weight, of a reinforcing filler in general use in the related art such as carbon black and/or silica. The carbon black and silica used may both be any one of those generally formulated into rubber compositions in the past.

Further, a softening agent, anti-aging agent, vulcanization adjuvant, wax, resin, and vulcanization compounding agent normally used in the rubber industry may be suitably used. Further, a foaming agent, low moisture plasticizer, staple fibers, etc. used in studless tires etc. in the past may also be used.

In blending the rubber composition for a tire according to the present invention, first, preferably, the rubber (i.e., matrix rubber and block copolymer) and the reinforcing filler and other compounding agents, other than the vulcanizing compounding agents, are mixed by an ordinary method, then the vulcanizing compounding agents are blended. Of course, it goes without saying that separate formulation of part of these ingredients falls in the technical scope of the present invention so long as the object of the present invention is not impaired. Further, the blending means may be one of the prior art.

The formulation of the rubber composition for a tire of the present invention may be vulcanized by a general method. The amount of formulation of the additives mentioned above may also be in general amounts. For example, it is preferable that the amount of formulation of sulfur is at least 0.5 part by weight, based on 100 parts by weight of the rubber component, more preferably 1.0 to 5.0 parts by weight. The vulcanization conditions of the rubber composition for a tire of the present invention may also use the general conditions.

The pneumatic tire according to a third aspect of the present invention is, as explained above, made of a rubber composition comprised of the mutually incompatible (i) NR and/or IR and (ii) SBR or BR in which is formulated the specific X"-Y" (or Y'") type block copolymer compatible with the same and in which a specific fine carbon black is formulated, and therefore, the phase structure of these rubber ingredients becomes finer (ideally, they become compatible), a uniform rubber phase is formed, and the carbon black is uniformly dispersed in the phase. By using this rubber composition to make the tread of the tire, it is possible to enhance the breaking strength and breaking energy and possible to improve the abrasion resistance and the chipping resistance.

The NR, IR, SBR having the glass transition temperature (Tg) of not more than −75° C., and the BR having the glass transition temperature (Tg) of not more than −75° C. used in the third aspect of the present invention may be generally commercially available products. Here, the Tg is made not more than −75° C. because if more than −75° C., the abrasion resistance and the heat buildup property decline— neither of which is preferable.

The X"-Y" (or Y'") type block copolymer is a block copolymer composed of the following block X" and block Y" or block Y'".

Block X"

A block of IR having a cis content of at least a 70% by weight. If the cis content is less than 70% by weight, the compatibility with NR or IR becomes poor, and therefore, the anticipated increased fineness of the phase structure can no longer be obtained.

Blocks Y" and Y'"

A block of a poly(styrene-butadiene) having a styrene content of less than 20% by weight and a bound 1,2-vinyl content of less than 50%, or a polybutadiene. With a styrene content of 20% by weight or more, the polymer becomes incompatible with SBR or BR having a Tg of not more than −75° C., and therefore the intended effect cannot be obtained. Further, with a bound 1,2-vinyl content of 50% or more, the polymer becomes incompatible with SBR or BR having a Tg of not more than −75° C., and therefore, the anticipated effect cannot be unpreferably obtained.

The ratio (weight ratio) of the X"/Y" (or Y'") in the X"-Y" (or Y'") type block copolymer should be 20 to 80/80 to 20. Outside of this range, the interlocking with the matrix rubber (NR, IR, SBR having a Tg of not more than −75° C., and BR having a Tg of not more than −75° C.) becomes smaller and the contribution to the compatibilization of the matrix rubber becomes insufficient. Further, the molecular weight of the X"-Y" (or Y'") type block copolymer should be at least 30,000, preferably 50,000 to 800,000. If less than 30,000, the interlocking with the matrix becomes smaller and the co-crosslinkability is also unpreferably decreased.

The X"-Y" (or Y'") type block copolymer is generally produced using an organic alkali metal compound catalyst such as butyl lithium in an organic solvent such as hexane by, for example, polymerizing isoprene to produce the block X" and further adding to this block in the terminal living state a styrene and butadiene or butadiene alone to produce the block Y" or the block Y'". At the time of this production, the ratio of formulation of the monomers, the vinylizing agent, polymerization conditions, etc. may be suitably selected as desired to obtain the desired block copolymer. Further, X"-Y" (or Y'") type block copolymers may be coupled by, for example, tin tetrachloride, silicon tetrachloride, etc. Further, as a separate method, the block X" and the block Y" or the block Y'" may be separately produced by ordinary methods, then coupled using a coupling agent such as tin tetrachloride or silicon tetrachloride.

The X"-Y" (or Y'") type block copolymer may be terminal modified by a modifying agent such as a compound having bonds shown by for example the following formula:

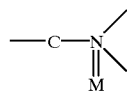

wherein M indicates an O atom or S atom for example, an amide compound, an imide compound, a lanthanum compound, or a urea compound. The terminal modification may be performed after the end of the copolymerization of the X"-Y" (or Y'") type block copolymer by the addition of a suitable modifying agent in the living state.

Further, the carbon black used in the third aspect of the present invention must be those having a CTAB surface area of more than 125 m$^2$/g, preferably 125 to 170 m$^2$/g, and a C-DBP oil absorption of 100 to 150 ml/100 g, preferably 110 to 130 mol/100 g. If a CTAB surface area is not more than 125 m$^2$/g, the heat buildup property becomes lower, but unpreferably it is not possible to improve both of the properties of the abrasion resistance and the chipping resistance. If a C-DBP oil absorption is less than 100 ml/100 g, the improvement of the abrasion resistance is insufficient, while if more 150 ml/100 g, the elongation declines and there is a remarkable reduction in the chipping resistance. The CTAB surface area is measured, according to ASTM D 3765-80. The C-DBP oil absorption is also called the 24M4DBP oil absorption and is measured, according to ASTM D 3493.

In the present invention, a pneumatic tire is formed by using, as a tread, a rubber composition composed of 100 parts by weight of a rubber component composed of (i) 50 to 90 parts by weight of NR and/or IR, (ii) 8 to 40 parts by weight of SBR or BR having a Tg of not more than −75° C., and (iii) 0.5 to 20 parts by weight of the above X"-Y" (or Y'") type block copolymer in which 35 to 55 parts by weight of carbon black is formulated. If the ratio of formulation is outside of this range, there is insufficient increase in fineness of compatibility of the phase structure of the matrix rubber. Note that the block copolymer used in the present invention gives a sufficient effect even in small amounts. According to the present invention, it is possible to produce a pneumatic tire by the same method as in the past using this rubber composition as a tread.

The above rubber composition may, optionally contain, the compounding agents generally formulated into tire use and other rubber compositions such as sulfur, vulcanization accelerators, anti-aging agents, fillers, softening agents, and plasticizers.

EXAMPLES

The present invention will now be explained in further detail with reference to Examples, Standard Examples, and Comparative Examples, but, of course, the scope of the present invention is not limited to these embodiments. The "parts" and "%" in the following Examples are all based on weight unless otherwise specified.

The methods of measurement of the physical properties were as follows:

Bound Styrene Content

The bound styrene content in the block copolymer was measured according to JIS K6383 (refraction rate method).

Bound Vinyl Content

The bound vinyl content of the conjugated diene portion in the block copolymer was measured by infrared spectrometry (Hampton method).

Molecular Weight and Distribution of Molecular Weight

The molecular weight and distribution of molecular weight of the block copolymer were measured by GPC. The weight average molecular weight (Mw) converted to standard polystyrene and the ratio (Mw/Mn) of the weight average molecular weight (Mw) and the number average molecular weight (Mn) for each were measured. As the columns, two GMH-HR-H made by Toso K.K. were used.

Mooney Viscosity

The Mooney viscosity ($ML_{1+4}$, 100° C.) was measured according to JIS K6301.

Transition Points

The transition points of the block copolymers, rubbers, and mixtures of the same were measured by weighing 10±5 mg from each sample, using a differential scanning calorimeter (DSC made by Perkin-Elmer Co.) to measure the differential scanning calories in a nitrogen atmosphere while raising the temperature from −150° C. to +150° C. at a rate of temperature rise of 80° C./minute, and differentiating the obtained endothermic curve to find the points of inflection. The points of inflection were used as the transition points.

Tensile Strength

The tensile strength was measured according to JIS K6301.

Abrasion Resistance

The abrasion resistance was measured using a Pico abrasion tester according to ASTM D2228. The abrasion resistance was indicated indexed to one of the Comparative Examples as 100 (abrasion resistance index). The larger this index, the better.

Vulcanization Rate

The vulcanization rate was determined by measuring the vulcanization density ratio. The vulcanization density ratio was obtained using an oscillating disk rheometer (ODR) made by Shimadzu Seisakusho to measure the difference between the minimum torque at 170° C. and the torque at 10 minutes time and indexing this to one of the Comparative Examples as 100. The slower the vulcanization rate, the longer the vulcanization time required. The higher at 10 minutes time (i.e., the larger the index), the faster the vulcanization rate shown.

Production Example I-1 (Example of Production of Block Copolymer I-1)

To a 20 liter autoclave equipped with a stirrer and a jacket, 8000 g of cyclohexane, 0.1 mmol of tetramethyl ethylene diamine (TMEDA), and 600 g of isoprene were charged. The temperature was raised to 70° C., then 1.8 ml of a hexane solution of n-butyl lithium (1.65 mmol/ml) was added to start the polymerization. After about 15 minutes, the conversion became about 100%, whereupon 4.3 mmol of TMEDA was added, then a mixed monomer of 280 g of styrene and 1120 g of 1,3-butadiene (styrene:butadiene= 20:80 (weight ratio)) was continuously added over about 50 minutes. After finishing adding this, after the elapse of about 10 minutes, 10 mmol of 1,3-butadiene was added and the reaction further conducted for 10 minutes. The polymerization conversion was about 100%. 10 mmol of isopropyl alcohol was added to stop the polymerization, then 2 g of phenol anti-aging agent (Irganox 1520 made by Ciba-Geigy)

was added, the solvent was removed by the steam stripping method, then the resulting product was dried to obtain the block copolymer I-1. The physical properties of the block copolymer I-1 were measured and shown in Table I-1.

Production Example I-2 (Example of Production of Block Copolymer I-2)

To a 20 liter autoclave equipped with a stirrer and a jacket, 8000 g of cyclohexane and 600 g of a 20:80 (weight ratio) mixed monomer of styrene and butadiene were charged. The temperature was raised to 70° C., then 1.8 ml of a hexane solution of n-butyllithium (1.65 mmol/ml) was added to start the polymerization. When the conversion became about 100%, the temperature was lowered to 40° C., then 4.3 mmol of TMEDA was added, then 1400 g of a 12:88 (weight ratio) mixed monomer of styrene and butadiene was added over 60 minutes. After the end of the polymerization reaction, the same procedure was applied as in Production Example I-1 to obtain the block copolymer I-2. The physical properties of the block copolymer I-2 were measured and shown in Table I-1.

Production Example I-3 (Example of Production of Block Copolymer I-3)

To a 20 liter autoclave equipped with a stirrer and a jacket, 8000 g of cyclohexane and 1000 g of isoprene were charged. The temperature was raised to 70° C., then 7 ml of a hexane solution of n-butyllithium (1.65 mmol/ml) was added to start the polymerization. When the conversion became about 100%, the temperature was lowered to 40° C., then 12 mmol of TMEDA was added, then 1000 g of a 17:83 (weight ratio) mixed monomer of styrene and butadiene was added over 60 minutes. After the end of the polymerization reaction, the same procedure was applied as in Production Example I-1 to obtain the block copolymer I-3. The physical properties of the block copolymer I-3 were measured and shown in Table I-1.

TABLE I-1

| Block copolymer no. | I-1 | I-2 | I-3 |
|---|---|---|---|
| A:B (weight ratio) | 30:70 | 30:70 | 50:50 |
| No. of transition points | 2 | 2 | 1 |
| Polymer block A | | | |
| S amount | 0 | 20 | 0 |
| V amount | 7 | 10 | 6 |
| Polymer block B | | | |
| S amount | 20 | 12 | 17 |
| V amount | 47 | 72 | 68 |
| S1 | 84 | 74 | 75 |
| S8 | 0.2 | 0.8 | 0.6 |
| (A-1,4):(B-1,4) | 51:49 | 56:44 | 77:23 |
| Mw × 10³ | 620 | 600 | 180 |
| Mw/Mn | 1.24 | 1.38 | 1.41 |

(Notes)
(A-1,4):(B-1,4) is the ratio of the amount of 1,4-bonds of the conjugated diene portion of the polymer block A and the amount of 1,4-bonds of the conjugated diene portion of the copolymer block B and was calculated by the following formula:
$[A \times (1-V_A)]:[B \times (1-S) \times (1-V_B)]$
A: wt % of polymer block A
B: wt % of polymer block B
$V_A$: bound vinyl content of conjugated diene portion of polymer block A (mol %)
$V_B$: bound vinyl content of conjugated diene portion of polymer block B (mol %)
S: bound styrene content of polymer block B Example I-1 (Rubber Composition: Bulk Kneading Method)

The rubber components (SBR and IR) shown in Table I-3 and the block copolymer I-1 were charged into a 0.25 liter Banbury mixer and mixed at 80° C. for 30 seconds. Next, the carbon black, zinc white, stearic acid, and naphthenic oil shown in Table 2 were added and mixed for 3 minutes. Further, an anti-aging agent was added and then the mixture was further mixed for 1 minute. The content was taken out and cooled to a temperature of not more than 50° C., then a vulcanization accelerator and sulfur were added and kneaded by a 50° C. roll. The rubber composition thus obtained was vulcanized at 170° C. for 12 minutes. The results of measurement of the physical properties are shown in Table I-3.

Examples I-2 to I-4 and Comparative Examples I-1 to I-2 (Rubber Compositions: Batch Mixing Method)

Each combination of the SBR and block copolymer shown in Table I-3 was charged into a 0.25 liter Banbury mixer and mixed at 80° C. for 30 seconds. Next, the IR shown in Table I-3 and the carbon black, zinc white, stearic acid, and naphthenic oil shown in Table I-2 were added and mixed for 3 minutes. Further, an anti-aging agent was added and then the mixture was further mixed for 1 minute. The content was taken out and cooled to a temperature of not more than 50° C., then a vulcanization accelerator and sulfur were added and mixed by a 50° C. roll. The rubber composition thus obtained was vulcanized at 170° C. for 12 minutes. The results of measurement of the physical properties are shown in Table I-3.

TABLE I-2

| Rubber | Changing amount |
|---|---|
| Block copolymer | Changing amount |
| Carbon black (*1) | 55.0 |
| Naphthenic oil (*2) | 10.0 |
| Zinc white | 3.0 |
| Stearic acid | 2.0 |
| Anti-aging agent (*3) | 2.0 |
| Sulfur #325 | 1.5 |
| Vulcanization accelerator (*4) | 1.2 |

(*1) N399 (Seast KH made by Tokai Carbon having nitrogen absorption specific area of 93 m²/g and oil absorption of 119 ml/100 g)
(*2) Sunsen 410 (made by Nippon Sekiyu)
(*3) Noclac 6C (made by Ouchi Shinkyo Chemical)
(*4) Noccelar CZ (made by Ouchi Shinkyo Chemical)

TABLE I-3

| | Examples | | | | Comp. Ex. | |
|---|---|---|---|---|---|---|
| | I-1 | I-2 | I-3 | I-4 | I-1 | I-2 |
| Block copolymer 1 | 10 | 10 | 20 | 2 | — | — |
| Block copolymer 2 | — | — | — | — | 10 | — |
| Block copolymer 3 | — | — | — | — | — | 10 |
| SBR (*1) | 45 | 45 | 40 | 49 | 45 | 45 |
| IR (*2) | 45 | 45 | 40 | 49 | 45 | 45 |
| Tensile strength (MPa) | 28 | 30 | 27 | 25 | 20 | 19 |
| Abrasion resistance (*3) | 134 | 154 | 126 | 110 | 100 | 105 |
| Vulcanization rate (*3) | 130 | 129 | 125 | 131 | 100 | 98 |

(*1) Solution polymerized styrene-butadiene copolymer rubber (bound styrene content = 20%, bound vinyl content 65 mol %, Mooney viscosity = 50)
(*2) Solution polymerized polyisoprene rubber (bound 1,4-cis content = 98%, Mooney viscosity 90)
(*3) All of the physical properties are shown indexed to Comparative Example I-1 as 100.

From the results of Table I-3, it is learned that if the block copolymer I-1 of the present invention is used, a rubber composition is obtained with an excellent vulcanization rate and superior properties such as tensile strength and abrasion resistance (see Examples I-1 to I-4). Further, it was learned that, when mixing two types of incompatible rubbers (SBR and IR) and the block copolymer I-1, the separation mixing method of mixing one rubber (SBR or IR) and the block copolymer I-1, then mixing the mixture and the other rubber has a higher effect of improvement of the tensile strength and the abrasion resistance than the all-at-once-mixing method of mixing the two types of rubbers and the block copolymer all together (comparison of Examples I-1 and I-2). According to the separation mixing method, a sufficient effect of improvement is manifested even if the amount of the block copolymer I-1 formulated is slight (Example I-4). On the other hand, when a block copolymer 1-3 with a single transition point is used (Comparative Example I-2), it is learned that the vulcanization rate is slow and the improvement of the tensile strength, abrasion resistance, etc. is insufficient.

Production Example I-4 (Example of Production of Block Copolymer I-4)

The same procedure was performed as in Production Example I-1, except that n-butyl lithium was used in an amount 1.5 times that of Production Example I-1, to obtain a block copolymer I-4 with a small molecular weight. The physical properties of the block copolymer are shown in Table I-4.

Production Example I-5 (Example of Production of Block Copolymer I-5)

The same procedure was performed as in Production Example I-1, except that the initial TMEDA was not added and the weight ratio of the isoprene and mixed monomer (styrene/1,3-butadiene) was made 40:60, to obtain a block copolymer I-5. The physical properties of the block copolymer are shown in Table I-4.

Production Example I-6 (Example of Production of Block Copolymer I-6)

The same procedure was performed as in Production Example I-1, except that TMEDA was not added before the second stage addition of the mixed monomer and the weight ratio of the isoprene and mixed monomer (styrene/1,3-butadiene) was made 50:50, to obtain a block copolymer I-6. The physical properties of the block copolymer are shown in Table I-4.

Production Example I-7 (Example of Production of Block Copolymer I-7)

The same procedure was performed as in Production Example I-1, except that the TMEDA was not added before the second stage addition of the mixed monomer, to obtain a block copolymer I-7. The physical properties of the block copolymer are shown in Table I-4.

Production Example I-8 (Example of Production of Block Copolymer I-8)

The same procedure was performed as in Production Example I-1, except that the weight ratio of the isoprene and mixed monomer (styrene/1,3-butadiene) was made 50:50, to obtain a block copolymer I-8. The physical properties are shown in Table I-4.

TABLE I-4

| Block copolymer no. | 4 | 5 | 6 | 7 | 8 |
|---|---|---|---|---|---|
| A:B (weight ratio) | 30:70 | 40:60 | 50:50 | 30:70 | 50:50 |
| No. of transition points | 2 | 2 | 2 | 2 | 2 |
| Polymer block A | | | | | |
| S amount | 0 | 0 | 0 | 0 | 0 |
| V amount | 7 | 6 | 6 | 7 | 7 |
| Polymer block B | | | | | |
| S amount | 20 | 20 | 20 | 20 | 20 |
| V amount | 45 | 30 | 10 | 30 | 50 |
| S1 | 85 | 75 | 68 | 80 | 82 |
| S8 | 0.2 | 0.4 | 0.8 | 0.7 | 0.6 |
| (A-1,4):(B-1,4) | 51:49 | 51:49 | 56:44 | 42:58 | 70:30 |
| Mw × 10³ | 400 | 580 | 590 | 580 | 620 |
| Mw/Mn | 1.18 | 1.42 | 1.38 | 1.25 | 1.22 |

Examples I-5 to I-11 and Comparative Example I-3

The same procedure was performed as in Example I-2 to prepare a rubber composition, except that the SBR used in Example I-2 was replaced with the different types of SBR shown in Table I-6, the block copolymer was replaced with the ones shown in Table I-6, and the formulation was replaced with those shown in Table I-5, then the rubber composition was vulcanized and the vulcanized properties were measured. The results are shown in Table I-6.

TABLE I-5

| Rubber | Changing amount |
|---|---|
| Block copolymer | Changing amount |
| Carbon black (*1) | 45.0 |
| Zinc white | 2.0 |
| Stearic acid | 1.5 |
| Anti-aging agent (*2) | 2.0 |
| Sulfur #325 | 1.5 |
| Vulcanization accelerator (*3) | 1.0 |

(*1) Seast 9H (nitrogen specific area of 144 m²/g and oil absorption of 129 ml/100 g, made by Tokai Carbon)
(*2) Noclac 6C (made by Ouchi Shinkyo Chemical)
(*3) Noccelar CZ (made by Ouchi Shinkyo Chemical)

TABLE I-6

| | | Example | | | | | | | Comp. Ex. |
|---|---|---|---|---|---|---|---|---|---|
| | | I-5 | I-6 | I-7 | I-8 | I-9 | I-10 | I-11 | I-3 |
| Block copolymer | No. | 1 | 4 | 5 | 6 | 7 | 8 | 7 | — |
| | Am't | 15 | 15 | 15 | 15 | 15 | 15 | 15 | — |
| SBR (*1) | | 28 | 28 | 28 | 28 | 28 | 28 | 28 | 28 |
| SBR (*2) | | 35 | 35 | 35 | 35 | 35 | 35 | — | — |

TABLE I-6-continued

|  | Example | | | | | | | Comp. Ex. |
|---|---|---|---|---|---|---|---|---|
|  | I-5 | I-6 | I-7 | I-8 | I-9 | I-10 | I-11 | I-3 |
| SBR (*3) | — | — | — | — | — | — | 35 | 40 |
| NR (*4) | 30 | 30 | 30 | 30 | 30 | 30 | 30 | 40 |
| Tensile strength (MPa) | 26 | 24 | 23 | 24 | 24 | 23 | 24 | 23 |
| Abrasion resistance (*5) | 143 | 126 | 123 | 113 | 125 | 110 | 109 | 100 |
| Vulcanization rate (*5) | 105 | 102 | 102 | 101 | 101 | 100 | 105 | 100 |

(*1) Emulsion polymerized styrene-butadiene copolymer rubber (bound styrene content = 23.5%, aromatic oil 40 PHR oil extended, Mooney viscosity = 50); note that in the 28 parts of the amount of formulation shown in Table I-6, the amount of formulation of the rubber component not including the aromatic oil component is 20 parts.
(*2) Solution polymerized styrene-butadiene copolymer rubber (bound styrene content = 20%, amount of vinyl bonds = 65 mol %, Mooney viscosity = 50)
(*3) Emulsion polymerized styrene-butadiene copolymer rubber (bound styrene content = 45%, Mooney viscosity = 50)
(*4) Natural rubber (SMR-CV60, Mooney viscosity = 60)
(*5) All physical properties are shown indexed to Comparative Example 3 as 100.

From the results of Table I-6, it is learned that the rubber compositions using the block copolymers of the present invention (Examples I-5 to I-11) exhibit a sufficiently fast vulcanization rate and are superior in tensile strength and abrasion resistance as well even compared with the combination of rubbers with fast vulcanization rates (Comparative Example I-3). Further, it is learned that the larger the weight average molecular weight (Mw) of a block copolymer, the better the vulcanization rate and the more superior the tensile strength and abrasion resistance as well (comparison of Examples I-5 and I-6), that the narrower the distribution of molecular weight, the more superior the properties of the tensile strength and the abrasion resistance (comparison of Examples I-5 and I-7), that the properties change when the ratio of the amounts of the 1,4-bonds (weight) between the block A and the block B differs and the closer the ratio to 50:50, the more superior the properties of the tensile strength and the abrasion resistance (comparison of Examples I-5, I-9, and I-10), that even if the ratio of the amounts of 1,4-bonds (weight) of the block A and the block B is away from 50:50, it is possible to improve the tensile strength and the abrasion resistance by making the distribution of the amount of molecular weight narrower (comparison of Examples I-7 and I-9), etc.

Production Example I-9 (Example of Production of Block Copolymer I-9)

To a 20 liter autoclave equipped with a stirrer and a jacket, 8000 g of cyclohexane, 0.6 mmol of TMEDA, and 1000 g of isoprene were charged. The temperature was raised to 70° C., then 3.5 ml of a hexane solution of n-butyl lithium (1.65 mmol/ml) was added to initiate the polymerization. When the conversion became about 100%, 8 mmol of TMEDA was added, then 1000 g of a 20:80 (weight ratio) mixed monomer of styrene and 1,3-butadiene was added continuously over about 60 minutes. After the end of the polymerization reaction, the same procedure was applied as in Production Example I-1 to obtain the block copolymer I-9. The physical properties of the block copolymer I-9 were measured and shown in Table I-7.

Production Example I-10 (Example of Production of Block Copolymer I-10)

To a 20 liter autoclave equipped with a stirrer and a jacket, 8000 g of cyclohexane, 0.6 mmol of TMEDA, and 300 g of 1,3-butadiene were charged. The temperature was raised to 70° C., then 3.1 ml of a hexane solution of n-butyl lithium (1.65 mmol/ml) was added to initiate the polymerization. When the conversion became about 100%, the temperature was lowered to 35° C., then 10 mmol of TMEDA was added, then 1700 g of a 14:86 (weight ratio) mixed monomer of styrene and 1,3-butadiene was added continuously over about 60 minutes. After the end of the polymerization reaction, the same procedure was applied as in Production Example I-1 to obtain the block copolymer I-10. The physical properties of the block copolymer I-10 were measured and shown in Table I-7.

TABLE I-7

| Block copolymer no. | I-9 | I-10 |
|---|---|---|
| A:B (weight ratio) | 40:60 | 30:70 |
| No. of transition points | 2 | 2 |
| Polymer block A | | |
| Conjugated diene | Isoprene | 1,3-butadiene |
| V amount | 12 | 14 |
| Polymer block B | | |
| S amount | 20 | 14 |
| V amount | 40 | 77 |
| S1 | 85 | 78 |
| S8 | 0.4 | 0.8 |
| (A-1,4):(B-1,4) | 55:45 | 52:48 |
| Mw × $10^3$ | 300 | 300 |
| Mw/Mn | 1.14 | 1.15 |

Examples I-12 to I-13

The same procedure was performed as in Example I-2 to prepare a rubber composition, except that the diene rubber used in Example I-2 was replaced by the SBR and natural rubber shown in Table I-9, the block copolymer was replaced with that shown in Table I-9, and the formulation was replaced with that shown in Table I-8, the rubber composition was vulcanized, and the vulcanized physical properties were measured. The results were shown in Table I-9.

TABLE I-8

| Rubber | Changing amount |
|---|---|
| Block copolymer | 10.0 |
| Carbon black (*1) | 70.0 |
| Wax | 1.0 |
| Zinc white | 2.0 |
| Stearic acid | 1.0 |
| Anti-aging agent (*2) | 2.0 |
| Sulfur #325 | 1.5 |
| Vulcanization accelerator (*3) | 2.0 |

(*1) Seast 9H (nitrogen specific area of 144 m$^2$/g and oil absorption of 129 ml/100 g, made by Tokai Carbon)
(*2) Noclac 6C (made by Ouchi Shinkyo Chemical)
(*3) Noccelar CZ (made by Ouchi Shinkyo Chemical)

TABLE I-9

| | Example | |
|---|---|---|
| | I-12 | I-13 |
| Block copolymer 9 | 10 | — |
| Block copolymer 10 | — | 10 |
| SBR (*1) | 45 | 45 |
| NR (*2) | 45 | 45 |
| Tensile strength (MPa) | 25 | 19 |
| Abrasion resistance (*3) | 144 | 100 |
| Vulcanization rate (*3) | 131 | 100 |

(*1) Emulsion polymerized styrene-butadiene copolymer rubber (bound styrene content = 25%, bound vinyl content = 55 mol %, aromatic oil 50PHR oil extended, Mooney viscosity = 60)
(*2) Natural rubber (SMR-CV60, Mooney viscosity = 60)
(*3) In this case, all of the physical properties are shown, indexed to Example 13 as 100.

From the results of Table I-9, it is learned that when the polymer block A is a polymer block of isoprene (Example I-12), the vulcanization rate, tensile strength, abrasion resistance, and other properties are all further improved compared with when it is a polymer block of 1,3-butadiene (Example I-13).

Regarding the vulcanization rate, when fabricating a tire, since there are a large number of members involved, the vulcanization times have to match or else some members will become overly vulcanized and there will be a serious effect on the durability and strength. Accordingly, it was found that the rubber composition of the present invention has superior properties in terms of practical use as well.

According to the present invention, a novel block copolymer is provided which can make two or more incompatible or poorly compatible diene rubbers compatible and further which can improve the properties such as the tensile strength and abrasion resistance without causing a delay in the vulcanization rate. The block copolymer of the present invention can provide a rubber composition superior in vulcanized properties and other various physical properties by being blended as a compatibilizing agent with the rubber ingredients of tire treads etc.

Viscoelasticity (tanδ)

A viscoelasticity spectrometer made by Toyo Seiki Seisakusho was used to measure tans at a static stress of 10%, a dynamic stress of ±2%, and a frequency of 20 Hz (sample width 5 mm, temperature 0° C. and 60° C.)

Abrasion Resistance Test

A Lambourn abrasion tester was used to measure this under conditions of a slip rate of 25% and a load of 5 kg. The results were shown indexed to the formulation of a Standard Example as 100 (abrasion resistance index). The larger the figure, the better the abrasion resistance shown.

Tensile Strength Test

Determined according to JIS K6301.

Determination of Incompatibility (Whether or Not Polymer Phases Are Formed)

1) The incompatibility of the polymer phases X' and Y' of a polymer blend is determined by vulcanizing the polymer blend, preparing an ultrathin sliced sample by the freezing method, then dyeing the air phase by a benzene solution of osmium tetroxide at room temperature for about 15 hours. This was observed through a transmission type electron microscope at a magnification of about 5000× to 10,000× to detect the presence of a phase separated structure.

2) The incompatibility of the blocks A' and B' of a block copolymer is determined by preparing a sample in the same way as above from the block copolymer in a nonvulcanized state, then observing it through a transmission type electron microscope at a magnification of about 60,000× to detect the presence of a phase separated structure.

3) The incompatibility of blocks of a block copolymer and the polymer phases of a polymer blend is determined by separately polymerizing and preparing polymers corresponding to the polymers comprising the blocks, mixing these with the various matrix polymers and vulcanizing the same, then preparing samples for observation under an electron microscope in the same way as above, and observing the same at magnifications of about 5000× to 10,000× to detect the presence of a phase separated structure.

The compatibility and incompatibility may also be determined by the determining method from a temperature dispersion curve of tanδ if a peak is bimodal or not or the determining method by DSC measurement if several glass transition temperatures of the blend polymer are observed or not. Further, this can be judged by an optical microscope as well if the phase separated structure extends over several dozen microns. Among these, direct observation by an electron microscope is the method with the greatest sensitivity, but the measurement is troublesome.

Standard Examples II-1 to II-15, Examples II-1 to II-22, and Comparative Examples II-1 to II-21

Using the block copolymers II-1 to II-16 of the properties shown in Table II-1, the ingredients of the formulations (parts by weight) of Table II-2 to Table II-6 were mixed by the following mixing method in a 1.7 liter Banbury mixer for 5 minutes, then a vulcanization accelerator and sulfur were mixed with the mixture by an 8-inch test use kneading roll machine for 4 minutes to obtain rubber compositions. These rubber compositions were press vulcanized at 160° C. for 20 minutes, the desired samples were prepared, and various tests were performed to measure the physical properties. The physical properties of the vulcanates obtained are as shown in Tables II-2 to II-6.

Mixing Method

The mixing operations in Examples II-1 to II-2 and Comparative Examples II-1 to II-21 were all performed by the following mixing specifications:

Rotational rate of rotor: 60 rpm

Temperature adjustment: 50° C.

Charging specifications

0' . . . rubber ingredients (matrix rubber, block copolymer)

1' . . . half of carbon black, zinc white, stearic acid

2' 30" . . . half of carbon black, anti-aging agent, wax, aromatic oil

3' 30" . . . ram upper and lower parts (ram portion and base portion)

4' 00" . . . discharge

TABLE II-I

|  | Block a | | | | Block b | | | |
| --- | --- | --- | --- | --- | --- | --- | --- | --- |
|  | Polymer type | St (wt %) | Vn (mol %) | 1,4-bonds (converted to molecular weight) | Polymer type | St (wt %) | Vn (mol %) | 1,4-bonds (converted to molecular weight) |
| Block copolymer II-1 (comp. ex.) | SBR | 21 | 50 | $6.12 \times 10^4$ | IR | 0 | 28 | $1.12 \times 10^5$ |
| Block copolymer II-2 (comp. ex.) | SBR | 20 | 46 | $1.27 \times 10^5$ | IR | 0 | 24 | $2.24 \times 10^5$ |
| Block copolymer II-3 (ex.) | SBR | 20 | 46 | $1.78 \times 10^5$ | IR | 0 | 22 | $1.38 \times 10^5$ |
| Block copolymer II-4 (comp. ex.) | SBR | 18 | 10 | $1.88 \times 10^4$ | SBR | 13 | 71 | $1.50 \times 10^4$ |
| Block copolymer II-5 (ex.) | SBR | 19 | 11 | $6.70 \times 10^4$ | SBR | 12 | 73 | $5.16 \times 10^4$ |
| Block copolymer II-6 (ex.) | SBR | 18 | 12 | $1.39 \times 10^5$ | SBR | 12 | 72 | $1.10 \times 10^5$ |
| Block copolymer II-7 (ex.) | SBR | 18 | 10 | $8.56 \times 10^4$ | SBR | 12 | 73 | $1.10 \times 10^5$ |
| Block copolymer II-8 (comp. ex.) | SBR | 18 | 11 | $1.78 \times 10^5$ | SBR | 12 | 73 | $8.70 \times 10^4$ |
| Block copolymer II-9 (comp. ex.) | SBR | 18 | 15 | $1.92 \times 10^5$ | SBR | 11 | 76 | $5.87 \times 10^4$ |
| Block copolymer II-10 (ex.) | SBR | 18 | 10 | $2.25 \times 10^5$ | IR | 0 | 7 | $2.84 \times 10^5$ |
| Block copolymer II-11 (comp. ex.) | SBR | 21 | 51 | $1.39 \times 10^4$ | SBR | 45 | 47 | $1.57 \times 10^4$ |
| Block copolymer II-12 (comp. ex.) | SBR | 21 | 51 | $6.97 \times 10^4$ | SBR | 45 | 47 | $1.22 \times 10^5$ |
| Block copolymer II-13 (ex.) | SBR | 21 | 50 | $6.32 \times 10^4$ | SBR | 45 | 46 | $7.13 \times 10^4$ |
| Block copolymer II-14 (ex.) | SBR | 21 | 51 | $8.83 \times 10^4$ | SBR | 45 | 47 | $9.97 \times 10^4$ |
| Block copolymer II-15 (ex.) | SBR | 21 | 51 | $1.27 \times 10^5$ | SBR | 45 | 47 | $1.43 \times 10^5$ |
| Block copolymer II-16 (ex.) | SBR | 21 | 51 | $1.28 \times 10^5$ | SBR | 40 | 24 | $1.18 \times 10^5$ |

|  | Block weight ratio | | 1,4-bond ratio a, b | Compatibility of blocks a, b | Weight average molecular weight Mw (10,000) |
| --- | --- | --- | --- | --- | --- |
|  | Block a Wa | Block b Wb | | | |
| Block copolymer II-1 (comp. ex.) | 0.5 | 0.5 | 0.55 | Incomp. | 31 |
| Block copolymer II-2 (comp. ex.) | 0.5 | 0.5 | 0.57 | Incomp. | 59 |
| Block copolymer II-3 (ex.) | 0.7 | 0.3 | 1.29 | Incomp. | 59 |
| Block copolymer II-4 (comp. ex.) | 0.3 | 0.7 | 1.25 | Incomp. | 8.5 |
| Block copolymer II-5 (ex.) | 0.3 | 0.7 | 1.30 | Incomp. | 31 |
| Block copolymer II-6 (ex.) | 0.3 | 0.7 | 1.26 | Incomp. | 64 |
| Block copolymer II-7 (ex.) | 0.2 | 0.8 | 0.78 | Incomp. | 58 |
| Block copolymer II-8 (comp. ex.) | 0.4 | 0.6 | 2.05 | Incomp. | 61 |
| Block copolymer II-9 (comp. ex.) | 0.5 | 0.5 | 3.26 | Incomp. | 55 |
| Block copolymer II-10 (ex.) | 0.5 | 0.5 | 0.79 | Incomp. | 61 |
| Block copolymer II-11 (comp. ex.) | 0.4 | 0.6 | 0.89 | Incomp. | 9 |
| Block copolymer II-12 (comp. ex.) | 0.3 | 0.7 | 0.57 | Incomp. | 60 |
| Block copolymer II-13 (ex.) | 0.4 | 0.6 | 0.89 | Incomp. | 40 |
| Block copolymer II-14 (ex.) | 0.4 | 0.6 | 0.89 | Incomp. | 57 |
| Block copolymer II-15 (ex.) | 0.4 | 0.6 | 0.89 | Incomp. | 82 |
| Block copolymer II-16 (ex.) | 0.56 | 0.44 | 1.08 | Incomp. | 59 |

TABLE II-2

|  | Stand. Ex. II-1 | Stand. Ex. II-2 | Stand. Ex. II-3 | Stand. Ex. II-4 | Comp. Ex. II-1 | Comp. Ex. II-2 | Ex. II-1 | Comp. Ex. II-3 |
| --- | --- | --- | --- | --- | --- | --- | --- | --- |
| Natural rubber *1 | 100 | 80 | 70 | 60 | 80 | 80 | 80 | 78 |
| High cis BR *2 | — | 20 | 30 | 40 | 19 | 19 | 19 | 19 |
| Block copolymer 1 | — | — | — | — | 1 | — | — | 3 |
| Block copolyaer 2 | — | — | — | — | — | 1 | — | — |
| Block copolymer 3 | — | — | — | — | — | — | 1 | — |

TABLE II-2-continued

|  |  |  |  |  |  |  |  |  |
|---|---|---|---|---|---|---|---|---|
| Carbon black *3 | 50 | 50 | 50 | 50 | 50 | 50 | 50 | 50 |
| Zinc white | 3 | 3 | 3 | 3 | 3 | 3 | 3 | 3 |
| Stearic acid | 2 | 2 | 2 | 2 | 2 | 2 | 2 | 2 |
| Anti-aging agent *4 | 2 | 2 | 2 | 2 | 2 | 2 | 2 | 2 |
| Paraffin wax | 1 | 1 | 1 | 1 | 1 | 1 | 1 | 1 |
| Sulfur | 1.7 | 1.7 | 1.7 | 1.7 | 1.7 | 1.7 | 1.7 | 1.7 |
| Vul. accelerator *5 | 0.8 | 0.8 | 0.8 | 0.8 | 0.8 | 0.8 | 0.8 | 0.8 |
| Tensile strength test |  |  |  |  |  |  |  |  |
| Tensile strength (MPa) | 31.5 | 30.0 | 29.1 | 27.2 | 31.0 | 31.0 | 31.1 | 31.0 |
| Elongation (%) | 530 | 500 | 499 | 488 | 503 | 505 | 542 | 531 |
| Viscoelasticity 20Hz, 10 ± 2% |  |  |  |  |  |  |  |  |
| tanδ (0° C.) | 0.288 | 0.261 | 0.243 | 0.231 | 0.251 | 0.253 | 0.258 | 0.254 |
| tanδ (60° C.) | 0.164 | 0.163 | 0.157 | 0.154 | 0.155 | n.160 | 0.166 | 0.158 |
| Abrasion resistance index | 90 | 100 | 122 | 123 | 102 | 102 | 107 | 105 |

|  | Comp. Ex. II-4 | Ex. II-2 | Comp. Ex. II-5 | Comp. Ex. II-6 | Ex. II-3 | Comp. Ex. II-7 | Comp. Ex. II-8 | Ex. II-4 |
|---|---|---|---|---|---|---|---|---|
| Natural rubber *1 | 78 | 78 | 60 | 60 | 60 | 60 | 60 | 60 |
| High cis BR *2 | 19 | 19 | 39 | 39 | 39 | 37 | 37 | 37 |
| Block copolymer 1 | — | — | 1 | — | — | 3 | — | — |
| Block copolymer 2 | 3 | — | — | 1 | — | — | 3 | — |
| Block copolymer 3 | — | 3 | — | — | 1 | — | — | 3 |
| Carbon black *3 | 50 | 50 | 50 | 50 | 50 | 50 | 50 | 50 |
| Zinc white | 3 | 3 | 3 | 3 | 3 | 3 | 3 | 3 |
| Stearic acid | 2 | 2 | 2 | 2 | 2 | 2 | 2 | 2 |
| Anti-aging agent *4 | 2 | 2 | 2 | 2 | 2 | 2 | 2 | 2 |
| Paraffin wax | 1 | 1 | 1 | 1 | 1 | 1 | 1 | 1 |
| Sulfur | 1.7 | 1.7 | 1.7 | 1.7 | 1.7 | 1.7 | 1.7 | 1.7 |
| Vulcanization accelerator *5 | 0.8 | 0.8 | 0.8 | 0.8 | 0.8 | 0.8 | 0.8 | 0.8 |
| Tensile strength test |  |  |  |  |  |  |  |  |
| Tensile strength (MPa) | 31.2 | 32.3 | 27.5 | 28.0 | 28.4 | 27.1 | 27.8 | 28.7 |
| Elongation (%) | 530 | 552 | 499 | 503 | 520 | 488 | 493 | 520 |
| Viscoelasticity 20Hz, 10 ± 2% |  |  |  |  |  |  |  |  |
| tanδ (0° C.) | 0.255 | 0.258 | 0.238 | 0.239 | 0.238 | 0.240 | 0.240 | 0.293 |
| tanδ (60° C.) | 0.159 | 0.162 | 0.164 | 0.163 | 0.165 | 0.163 | 0.160 | 0.161 |
| Abrasion resistance index | 105 | 111 | 123 | 122 | 128 | 123 | 125 | 133 |

*1. TTR-20,
*2. Nipol BR1220 (made by Nippon Zeon),
*3. Seast 6 (made by Tokai Carbon),
*4. Santoflex 13 (made by Monsanto),
*5. Santocure NS (made by Monsanto)

TABLE II-3

|  | Stand. Ex. II-5 | Stand. Ex. II-6 | Stand. Ex. II-7 | Stand. Ex. II-8 | Stand. Ex. II-9 | Comp. Ex. II-9 | Comp. Ex. II-10 | Ex. II-5 | Ex. II-6 | Ex. II-7 |
|---|---|---|---|---|---|---|---|---|---|---|
| Natural rubber *1 | 30 | 40 | 50 | 60 | 70 | 45 | 45 | 45 | 47.5 | 42.5 |
| SBR *2 | 70 | 60 | 50 | 40 | 30 | 45 | 45 | 45 | 47.5 | 42.5 |
| Block copolymer 1 | — | — | — | — | — | 10 | — | — | — | — |
| Block copolymer 2 | — | — | — | — | — | — | 10 | — | — | — |
| Block copolymer 3 | — | — | — | — | — | — | — | 10 | 5 | 15 |
| Carbon black *3 | 50 | 50 | 50 | 50 | 50 | 50 | 50 | 50 | 50 | 50 |
| Zinc white | 3 | 3 | 3 | 3 | 3 | 3 | 3 | 3 | 3 | 3 |
| Stearic acid | 1 | 1 | 1 | 1 | 1 | 1 | 1 | 1 | 1 | 1 |
| Anti-aging agent *4 | 2 | 2 | 2 | 2 | 2 | 2 | 2 | 2 | 2 | 2 |
| Paraffin wax | 1 | 1 | 1 | 1 | 1 | 1 | 1 | 1 | 1 | 1 |
| Sulfur | 2 | 2 | 2 | 2 | 2 | 2 | 2 | 2 | 2 | 2 |
| Vul. accelerator *5 | 1 | 1 | 1 | 1 | 1 | 1 | 1 | 1 | 1 | 1 |
| Tensile strength test |  |  |  |  |  |  |  |  |  |  |
| Tensile strength (MPa) | 23.0 | 25.4 | 23.2 | 24.6 | 27.0 | 23.8 | 23.9 | 24.6 | 24.3 | 24.8 |
| Elongation (%) | 366 | 384 | 360 | 386 | 434 | 365 | 368 | 390 | 390 | 396 |
| Viscoelasticity 20Hz, 10 ± 2% |  |  |  |  |  |  |  |  |  |  |
| tanδ (0° C.) | 0.331 | 0.337 | 0.332 | 0.323 | 0.313 | 0.336 | 0.333 | 0.332 | 0.334 | 0.329 |

TABLE II-3-continued

|  | Stand. Ex. II-5 | Stand. Ex. II-6 | Stand. Ex. II-7 | Stand. Ex. II-8 | Stand. Ex. II-9 | Comp. Ex. II-9 | Comp. Ex. II-10 | Ex. II-5 | Ex. II-6 | Ex. II-7 |
|---|---|---|---|---|---|---|---|---|---|---|
| tanδ (60° C.) | 0.159 | 0.165 | 0.176 | 0.168 | 0.169 | 0.178 | 0.174 | 0.175 | 0.165 | 0.164 |
| Abrasion resistance index | 90 | 94 | 100 | 103 | 111 | 106 | 109 | 119 | 117 | 120 |

*1. TTR-20,
*2. Solution polymerized SBR: styrene = 24%, vinyl = 33 mol %,
*3. Seast KH (made by Tokai Carbon),
*4. Santoflex 13 (made by Monsanto),
*5. Santocure NS (made by Monsanto)

TABLE II-4

|  | Stand. Ex. II-11 | Stand. Ex. II-12 | Stand. Ex. II-13 | Stand. Ex. II-14 | Stand. Ex. II-15 |
|---|---|---|---|---|---|
| SBR *1 | 150.00 | 135.00 | 127.50 | 120.00 | 75.00 |
| High cis BR *2 | — | 10.00 | 15.00 | 20.00 | 50.00 |
| Block copolymer 11 | — | — | — | — | — |
| Block copolymer 12 | — | — | — | — | — |
| Block copolymer 13 | — | — | — | — | — |
| Block copolymer 14 | — | — | — | — | — |
| Block copolymer 15 | — | — | — | — | — |
| Block copolymer 16 | — | — | — | — | — |
| Carbon black *3 | 95.00 | 95.00 | 95.00 | 95.00 | 95.00 |
| Aromatic oil | 4.69 | 9.69 | 12.19 | 14.69 | 29.69 |
| Stearic acid | 2.00 | 2.00 | 2.00 | 2.00 | 2.00 |
| Zinc white | 3.00 | 3.00 | 3.00 | 3.00 | 3.00 |
| Paraffin wax | 0.50 | 0.50 | 0.50 | 0.50 | 0.50 |
| Anti-aging agent *4 | 2.00 | 2.00 | 2.00 | 2.00 | 2.00 |
| Vul. accelerator *5 | 1.81 | 1.81 | 1.81 | 1.81 | 1.81 |
| Sulfur | 1.90 | 1.90 | 1.90 | 1.90 | 1.90 |
| Tensile strength test |  |  |  |  |  |
| Tensile strength (MPa) | 19.3 | 19.3 | 19.0 | 18.5 | 18.0 |
| Elongation (%) | 610 | 620 | 633 | 680 | 697 |
| Viscoelasticity (20Hz, 10 ± 2%) |  |  |  |  |  |
| tanδ (0° C.) | 0.892 | 0.825 | 0.812 | 0.78 | 0.686 |
| tanδ (60° C.) | 0.572 | 0.552 | 0.551 | 0.543 | 0.507 |
| Abrasion resistance index | 92 | 97 | 100 | 125 | 118 |

|  | Comp. Ex. II-18 | Comp. Ex. II-19 | Ex. II-15 | Ex. II-16 | Ex. II-17 | Ex. II-18 |
|---|---|---|---|---|---|---|
| SBR *1 | 123.68 | 123.68 | 123.68 | 123.68 | 123.68 | 123.68 |
| High cis BR *2 | 14.55 | 14.55 | 14.55 | 14.55 | 14.55 | 14.55 |
| Block copolymer 11 | 3.00 | — | — | — | — | — |
| Block copolymer 12 | — | 3.00 | — | — | — | — |
| Block copolymer 13 | — | — | 3.00 | — | — | — |
| Block copolymer 14 | — | — | — | 3.00 | — | — |
| Block copolymer 15 | — | — | — | — | 3.00 | — |
| Block copolymer 16 | — | — | — | — | — | 3.00 |
| Carbon black *3 | 95.00 | 95.00 | 95.00 | 95.00 | 95.00 | 95.00 |
| Aromatic oil | 13.46 | 13.46 | 13.46 | 13.46 | 13.46 | 13.46 |
| Stearic acid | 2.00 | 2.00 | 2.00 | 2.00 | 2.00 | 2.00 |
| Zinc white | 3.00 | 3.00 | 3.00 | 3.00 | 3.00 | 3.00 |
| Paraffin wax | 0.50 | 0.50 | 0.50 | 0.50 | 0.50 | 0.50 |
| Anti-aging agent *4 | 2.00 | 2.00 | 2.00 | 2.00 | 2.00 | 2.00 |
| Vul. accelerator *5 | 1.81 | 1.81 | 1.81 | 1.81 | 1.81 | 1.81 |
| Sulfur | 1.90 | 1.90 | 1.90 | 1.90 | 1.90 | 1.90 |
| Tensile strength test |  |  |  |  |  |  |
| Tensile strength (MPa) | 19.1 | 19.1 | 19.2 | 19.4 | 19.8 | 19.5 |
| Elongation (%) | 640 | 638 | 677 | 650 | 680 | 677 |
| Viscoelasticity 20Hz, 10 ± 2% |  |  |  |  |  |  |
| tanδ (0° C.) | 0.815 | 0.816 | 0.822 | 0.826 | 0.825 | 0.832 |

TABLE II-4-continued

|  | | | | | | |
|---|---|---|---|---|---|---|
| tanδ (60° C.) | 0.55 | 0.549 | 0.548 | 0.547 | 0.548 | 0.544 |
| Abrasion resistance index | 102 | 101 | 112 | 110 | 103 | 108 |

|  | Comp. Ex. II-20 | Comp. Ex. II-21 | Ex. II-19 | Ex. II-20 | Ex. II-21 | Ex. II-22 |
|---|---|---|---|---|---|---|
| SBR *1 | 108.38 | 108.38 | 108.38 | 108.38 | 108.38 | 108.38 |
| High cis BR *2 | 12.75 | 12.75 | 12.75 | 12.75 | 12.75 | 12.75 |
| Block copolymer 11 | 15.00 | — | — | — | — | — |
| Block copolymer 12 | — | 15.00 | — | — | — | — |
| Block copolymer 13 | — | — | 15.00 | — | — | — |
| Block copolymer 14 | — | — | — | 15.00 | — | — |
| Block copolymer 15 | — | — | — | — | 15.00 | — |
| Block copolymer 16 | — | — | — | — | — | 15.00 |
| Carbon black *3 | 95.00 | 95.00 | 95.00 | 95.00 | 95.00 | 95.00 |
| Aromatic oil | 18.56 | 18.56 | 18.56 | 18.56 | 18.56 | 18.56 |
| Stearic acid | 2.00 | 2.00 | 2.00 | 2.00 | 2.00 | 2.00 |
| Zinc white | 3.00 | 3.00 | 3.00 | 3.00 | 3.00 | 3.00 |
| Paraffin wax | 0.50 | 0.50 | 0.50 | 0.50 | 0.50 | 0.50 |
| Anti-aging agent *4 | 2.00 | 2.00 | 2.00 | 2.00 | 2.00 | 2.00 |
| Vul. accelerator *5 | 1.81 | 1.81 | 1.81 | 1.81 | 1.81 | 1.81 |
| Sulfur | 1.90 | 1.90 | 1.90 | 1.90 | 1.90 | 1.90 |
| Tensile strength test | | | | | | |
| Tensile strength (MPa) | 19.1 | 19.1 | 19.3 | 19.3 | 19.2 | 19.6 |
| Elongation (%) | 637 | 640 | 637 | 663 | 650 | 697 |
| Viscoelasticity 20Hz, 10 ± 2% | | | | | | |
| tanδ (0° C.) | 0.813 | 0.813 | 0.827 | 0.825 | 0.83 | 0.832 |
| tanδ (60° C.) | 0.55 | 0.549 | 0.547 | 0.545 | 0.547 | 0.547 |
| Abrasion resistance index | 102 | 102 | 107 | 104 | 104 | 110 |

*1. High St-SBR oil extended = 50 parts,
*2. Nipol BR1220 (made by Nippon Zeon),
*3. Seast 9M (made by Tokai Carbon),
*4. Santoflex 13 (made by Monsanto),
*5. Santocure NS (made by Monsanto).

TABLE II-5

|  | Stand. Ex. II-10 | Comp. Ex. II-14 | Comp. Ex. II-15 | Ex. II-11 | Ex. II-12 | Comp. Ex. II-16 | Comp. Ex. II-17 | Ex. II-13 | Ex. II-14 |
|---|---|---|---|---|---|---|---|---|---|
| Natural rubber *1 | 65 | 60 | 60 | 60 | 60 | 50 | 50 | 50 | 50 |
| SBR *2 | 25 | 20 | 20 | 20 | 20 | 30 | 30 | 30 | 30 |
| SBR *3 | 15 | 15 | 15 | 15 | 15 | 15 | 15 | 15 | 15 |
| Block copolymer 1 | — | 10 | — | — | — | 10 | — | — | — |
| Block copolymer 2 | — | — | 10 | — | — | — | 10 | — | — |
| Block copolymer 3 | — | — | — | 10 | — | — | — | 10 | — |
| Block copolymer 10 | — | — | — | — | 10 | — | — | — | 10 |
| Carbon black *4 | 50 | 50 | 50 | 50 | 50 | 50 | 50 | 50 | 50 |
| Aromatic oil | 2 | 2 | 2 | 2 | 2 | 2 | 2 | 2 | 2 |
| Zinc white | 3 | 3 | 3 | 3 | 3 | 3 | 3 | 3 | 3 |
| Stearic acid | 2 | 2 | 2 | 2 | 2 | 2 | 2 | 2 | 2 |
| Anti-aging agent *5 | 2 | 2 | 2 | 2 | 2 | 2 | 2 | 2 | 2 |
| Paraffin wax | 1 | 1 | 1 | 1 | 1 | 1 | 1 | 1 | 1 |
| Sulfur | 1.7 | 1.7 | 1.7 | 1.7 | 1.7 | 1.7 | 1.7 | 1.7 | 1.7 |
| Vul. accelerator *6 | 0.7 | 0.7 | 0.7 | 0.7 | 0.7 | 0.7 | 0.7 | 0.7 | 0.7 |
| Tensile strength test | | | | | | | | | |
| Tensile strength (MPa) | 24.5 | 24.9 | 25.2 | 25.7 | 24.6 | 22.1 | 22.6 | 23.2 | 23.7 |
| Elongation (%) | 576 | 580 | 582 | 591 | 544 | 500 | 506 | 520 | 526 |
| Viscoelasticity 20Hz, 10 ± 2% | | | | | | | | | |
| tanδ (0° C.) | 0.488 | 0.489 | 0.485 | 0.485 | 0.481 | 0.524 | 0.520 | 0.524 | 0.523 |

TABLE II-5-continued

|  | Stand. Ex. II-10 | Comp. Ex. II-14 | Comp. Ex. II-15 | Ex. II-11 | Ex. II-12 | Comp. Ex. II-16 | Comp. Ex. II-17 | Ex. II-13 | Ex. II-14 |
|---|---|---|---|---|---|---|---|---|---|
| tanδ (60° C.) | 0.211 | 0.217 | 0.209 | 0.210 | 0.201 | 0.196 | 0.190 | 0.190 | 0.191 |
| Abrasion resistance index | 100 | 107 | 110 | 125 | 122 | 100 | 101 | 116 | 107 |

*1. TTR-20,
*2. Solution polymerized SBR Nipol NS-116 (made by Nippon Zeon): styrene = 21%, vinyl = 63 mol %,
*3. Emulsion polymerized SBR Nipol 9529 (made by Nippon Zeon): styrene = 45%, oil extended = 50 parts,
*4. Seast KH (made by Tokai Carbon),
*5. Santoflex 13 (made by Monsanto),
*6. Santocure NS (made by Monsanto).

TABLE II-6

|  | Stand. Ex. II-7 | Comp. Ex. II-11 | Ex. II-8 | Ex. II-9 | Ex. II-10 | Comp. Ex. II-12 | Comp. Ex. II-13 |
|---|---|---|---|---|---|---|---|
| Natural rubber *1 | 50 | 46 | 46 | 46 | 46 | 46 | 46 |
| SBR *2 | 50 | 46 | 46 | 46 | 46 | 46 | 46 |
| Block copolymer 4 | — | 8 | — | — | — | — | — |
| Block copolymer 5 | — | — | 8 | — | — | — | — |
| Block copolymer 6 | — | — | — | 8 | — | — | — |
| Block copolymer 7 | — | — | — | — | 8 | — | — |
| Block copolymer 8 | — | — | — | — | — | 8 | — |
| Block copolymer 9 | — | — | — | — | — | — | 8 |
| Carbon black *3 | 47 | 47 | 47 | 47 | 47 | 47 | 47 |
| Zinc white | 3 | 3 | 3 | 3 | 3 | 3 | 3 |
| Stearic acid | 1 | 1 | 1 | 1 | 1 | 1 | 1 |
| Anti-aging agent *4 | 2 | 2 | 2 | 2 | 2 | 2 | 2 |
| Paraffin wax | 1 | 1 | 1 | 1 | 1 | 1 | 1 |
| Sulfur | 2 | 2 | 2 | 2 | 2 | 2 | 2 |
| Vul. accelerator *5 | 1 | 1 | 1 | 1 | 1 | 1 | 1 |
| Tensile strength test |  |  |  |  |  |  |  |
| Tensile strength (MPa) | 23.2 | 23.0 | 23.4 | 24.0 | 24.0 | 23.4 | 23.3 |
| Elongation (%) | 360 | 357 | 368 | 370 | 369 | 366 | 358 |
| Viscoelasticity 20Hz, 10 ± 2% |  |  |  |  |  |  |  |
| tanδ (0° C.) | 0.332 | 0.339 | 0.333 | 0.330 | 0.331 | 0.332 | 0.333 |
| tanδ (60° C.) | 0.176 | 0.181 | 0.178 | 0.175 | 0.176 | 0.175 | 0.175 |
| Abrasion resistance index | 100 | 99 | 109 | 118 | 116 | 108 | 106 |

*1. TTR-20,
*2. Solution polymerized SBR: styrene = 24%, vinyl = 33 mol %,
*3. Seast KH (made by Tokai Carbon),
*4. Santoflex 13 (made by Monsanto),
*5. Santocure NS (made by Monsanto).

Examples III-1 to III-4 and Comparative Examples III-1 to III-8

Ingredients were blended by the formulations (parts by weight) shown in Table III-1 and Table III-2 to prepare rubber compositions (Examples III-1 to III-3 and Comparative Examples III-1 to III-8). At the time of formulation, the compounding agents, other than the vulcanization accelerator and sulfur, and the starting rubber were mixed in a 1.7 liter Banbury mixer for 5 minutes, then the vulcanization accelerator and sulfur were formulated into the mixtures and the resultant mixture was kneaded by an 8-inch test kneading roll machine for 4 minutes to obtain the rubber compositions. These rubber compositions were press vulcanized at 150° C. for 30 minutes and test pieces were prepared. These were used for evaluation of the abrasion resistance and chipping resistance in the following way. The results are shown in Table III-2.

Abrasion Resistance

A Lambourn abrasion tester was used to measure this according to JIS K6264 under conditions of a load of 4.0 kg and a slip rate of 30%. The test result was indicated indexed to (amount of abrasion of Comparative Example III-3)×100/ (amount of abrasion of sample) as 100. The larger the index value, the better the abrasion resistance.

Chipping Resistance

This was based on measurement of the breaking energy. The breaking energy was found by conducting a tensile test according to JIS K6301 and using the area from the stress-strain curve until breakage as the breaking energy. This was shown indexed to Comparative Example III-3 as 100. The larger the index value, the higher the breaking energy and the better the chipping resistance.

TABLE III-1

| Rubber | 100 parts by weight (listed in Table III-2) |
|---|---|
| Carbon black | Changed amount (listed in Table III-2) |
| Zinc oxide | 5 parts by weight |
| Stearic acid | 3 parts by weight |
| Anti-aging agent | 2 parts by weight |
| Aromatic oil | 3 parts by weight |
| Sulfur | 1.5 parts by weight |
| Vulcanization accelerator | 1.0 part by weight |

Abrasion Resistance

The remaining tread of the tire was measured after use on an actual vehicle (running distance $5 \times 10^4$ km) to calculate the running distance per 1 mm abrasion. The abrasion resistance was evaluated based on this running distance. The results of the evaluation are shown indexed to a tire using the rubber composition of Comparative Example III-3 as a tread rubber as 100. The larger the index value, the better the abrasion resistance.

Chipping Resistance

This was judged by the 5-point method by visually inspecting the appearance. The larger the value, the better the chipping resistance.

TABLE III-2

|  | Comp. Ex. III-1 | Comp. Ex. III-2 | Comp. Ex. III-3 | Ex. III-1 | Ex. III-2 | Ex. III-3 | Ex. III-4 | Comp. Ex. III-4 | Comp. Ex. III-5 | Comp. Ex. III-6 | Comp. Ex. III-7 | Comp. Ex. III-8 |
|---|---|---|---|---|---|---|---|---|---|---|---|---|
| NR (SMR 20) | 100 | 80 | 80 | 68 | 68 | 60 | 78 | 68 | 42.5 | 68 | 68 | 68 |
| High cis BR (Tg-105° C.) | — | 20 | — | 17 | — | — | 20 | — | — | — | 17 | 17 |
| Low styrene SBR (Tg-90° C.) | — | — | 20 | — | 17 | 25 | — | 17 | 42.5 | — | — | — |
| High styrene SBR (Tg-45° C.) | — | — | — | — | — | — | — | — | — | 17 | — | — |
| A-B type block copolymer *1 | — | — | — | 15 | 15 | 15 | 2 | 15 | 15 | 15 | 15 | 15 |
| Carbon black CB-1 *2 | — | — | — | — | — | — | — | 50 | — | — | — | — |
| Carbon black CB-2 *3 | 50 | 50 | 50 | 50 | 50 | 50 | 50 | — | 50 | 50 | 65 | — |
| Carbon black CB-3 *4 | — | — | — | — | — | — | — | — | — | — | — | 50 |
| Abrasion resistance | 96 | 104 | 1o0 | 111 | 109 | 113 | 110 | 99 | 127 | 92 | 98 | 98 |
| Breaking energy | 98 | 92 | 100 | 103 | 107 | 103 | 109 | 106 | 90 | 95 | 99 | 109 |

Notes)
*1. Block (A): IR having 80% cis content, Block (B): SBR with 12% by weight styrene content and 20% 1,2-vinyl bond content, A/B (weight ratio) = 50/50.
*2. CTAB surface area: 110 $m^2/g$, C-DBP oil absorption: 95 ml/100 g.
*3. CTAB surface area: 140 $m^2/g$, C-DBP oil absorption: 105 ml/100 g.
*4. CTAB surface area: 140 $m^2/g$, C-DBP oil absorption: 93 ml/100 g.

In Table III-2, Comparative Example III-3 is the case where the A-B type block copolymer is not included. Compared with Comparative Example III-3, the rubber compositions of the present invention (Examples III-1 to III-4) are superior in both of the abrasion resistance and the chipping resistance (breaking energy). Comparative Example III-1 is the case where neither BR, SBR, nor the A-B type block copolymer is included, while Comparative Example III-2 is the case where the A-B type block copolymer is not included (difference from Comparative Example III-3 is that Comparative Example III-3 uses SBR, while Comparative Example III-2 uses BR).

Comparative Example III-4 is the case where a carbon black outside of the scope of the present invention is used, Comparative Example III-5 is the case where the NR and SBR are used in amounts outside of the scope of the present invention, Comparative Example III-6 is the case where an SBR outside of the scope of the present invention is used, Comparative Example III-7 is the case where the carbon black is used in an amount outside of the scope of the present invention, and Comparative Example III-8 is the case where a carbon black outside of the present invention is used.

Using several types of rubber compositions of Table III-2 as tread rubber, 1000 R20 14 PR large tires for truck use were prepared and subjected to running tests on a good road/poor road=90/10 course. The abrasion resistance was evaluated as follows from the remaining treads after running for $5 \times 10^4$ km and the appearance was inspected visually to evaluate the chipping resistance. The results are shown in Table III.

TABLE III

| Tread rubber | Comp. Ex. III-2 | Comp. Ex. II-3 | Ex. III-1 | Ex. III-4 | Comp. Ex. III-4 |
|---|---|---|---|---|---|
| Abrasion resistance | 107 | 100 | 115 | 112 | 97 |
| Chipping resistance | 1 | 3 | 4 | 5 | 4 |

From Table III-3, it is learned that a tire using a rubber composition of the present invention as a tread rubber is superior in abrasion resistance and chipping resistance.

INDUSTRIAL APPLICABILITY

As explained above, according to the present invention, by configuring a tread by a rubber composition comprised of a rubber component comprising (a) a natural rubber and/or polyisoprene rubber part, (b) a styrene-butadiene copolymer rubber or polybutadiene rubber having a specific glass transition temperature, and (c) an A-B (or B') type block copolymer composed of a block (a) of a polyisoprene having a specific cis content and a block (B) of a poly(styrene-butadiene) having a specific styrene content and 1,2-vinyl bond content or block (B') of a polybutadiene in which carbon black having a CTAB surface area of over 125 $m^2/g$ and a C-DBP oil absorption of 100 to 150 ml/100 g is formulated, it is possible to improve the abrasion resistance and the chipping resistance.

What is claimed is:

1. A block copolymer (1) containing a polymer block A of 2-methyl-1,3-butadiene and a random copolymer B of a conjugated diene and an aromatic vinyl compound, (2) having a weight ratio (A:B) of the polymer block A and the copolymer block B of 5:95 to 95:5, (3) having a bound aromatic vinyl compound content in the copolymer block B of 1 to 50% by weight, (4) having a weight average molecular weight (Mw) of 100,000 to 5,000,000, and (5) having at least two transition points measured by differential scanning calorimetry in the range of −150° C. to +150° C.

2. A block copolymer as claimed in claim 1, wherein the ratio Mw/Mn of the weight average molecular weight (Mw) to the number average molecular weight (Mn) is not more than 2.5.

3. A method of producing a block copolymer comprising the step of: in a hydrocarbon based solvent using an organic active metal as an initiator, (I) (i) first polymerizing a conjugated diene to produce a polymer block A of 2-methyl-1,3-butadiene, then (ii) polymerizing a mixture of a conjugated diene and an aromatic vinyl compound in the presence of a polymer block A having an active end or (II) (i) first polymerizing a mixture of a conjugated diene and an aromatic vinyl compound to produce a random copolymer block B, and then (ii) polymerizing 2-methyl-1,3-butadiene in the presence of a copolymer block B having an active end to produce a polymer block A of a conjugated diene.

4. A method of producing a block copolymer as claimed in claim 3, further comprising, in step (I), preparing a mixture containing a hydrocarbon solvent, a Lewis base, and a conjugated diene, adding an organic active metal to initiate a polymerization reaction whereby a polymer block A of 2-methyl-1,3-butadiene is formed, then adding a mixture of a conjugated diene and an aromatic vinyl compound to further carry out polymerization.

5. A rubber composition comprising a block copolymer (1) containing a polymer block A of 2-methyl-1,3-butadiene and a random copolymer block B of a conjugated diene and an aromatic vinyl compound, (2) having a weight ratio (A:B) of the polymer block A and the copolymer block B of 5:95 to 95:5, (3) having a bound aromatic vinyl compound content in the copolymer block B of 1 to 50% by weight, (4) having a weight average molecular weight (Mw) of 100,000 to 5,000,000, and (5) having at least two transition points measured by differential scanning calorimetry in the range of −150° C. to +150° C. and at least one diene rubber.

6. A rubber composition as claimed in claim 5, wherein the diene rubber includes at least one diene rubber (X) compatible with the polymer block A in the block copolymer and at least one diene rubber (Y) compatible with the copolymer block B.

7. A method of producing a rubber composition comprising mixing a block copolymer (1) containing a polymer block A of 2-methyl-1,3-butadiene and a random copolymer block B of a conjugated diene and an aromatic vinyl compound, (2) having a weight ratio (A:B) of the polymer block A to the copolymer block B of 5:95 to 95:5, (3) having a bound aromatic vinyl content in the copolymer block B of 1 to 50% by weight, (4) having a weight average molecular weight (Mw) of 100,000 to 5,000,000, and (5) having at least two transition points measured by differential scanning calorimetry in the range of −150° C. to +150° C. and at least one diene rubber so as to produce a rubber composition, wherein at least one diene rubber (X) compatible with the polymer block A in the block copolymer and at least one diene rubber (Y) compatible with the copolymer block B are used as the diene rubber, the block copolymer is first mixed with either one component of the diene rubber (X) component and diene rubber (Y) component of the diene rubber, followed by mixing with the other component.

* * * * *